(12) United States Patent
Attar et al.

(10) Patent No.: US 7,088,701 B1
(45) Date of Patent: Aug. 8, 2006

(54) METHOD AND APPARATUS FOR ADAPTIVE TRANSMISSION CONTROL IN A HIGH DATA RATE COMMUNICATION SYSTEM

(75) Inventors: Rashid Attar, San Diego, CA (US); Roberto Padovani, San Diego, CA (US); Peter J. Black, San Diego, CA (US); Nagabhushana T. Sindhushayana, San Diego, CA (US); Eduardo A. S. Esteves, San Diego, CA (US); Mehmet Gurelli, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/549,416

(22) Filed: Apr. 14, 2000

(51) Int. Cl.
H04B 12/56 (2006.01)

(52) U.S. Cl. ......................... 370/347; 370/465
(58) Field of Classification Search ................. 370/333, 370/336, 337, 347, 465, 468, 477; 375/261, 375/264, 298
See application file for complete search history.

(56) References Cited

U.S. PATENT DOCUMENTS

| | | | |
|---|---|---|---|
| 4,718,066 A | | 1/1988 | Rogard ..................... 371/35 |
| 4,901,307 A | | 2/1990 | Gilhousen et al. |
| 5,103,459 A | | 4/1992 | Gilhousen et al. |
| 5,267,261 A | | 11/1993 | Blakeney, II et al. |
| 5,303,234 A | * | 4/1994 | Kou ........................ 370/442 |
| 5,377,192 A | * | 12/1994 | Goodings et al. ........... 370/348 |
| 5,504,773 A | | 4/1996 | Padovani et al. |
| 5,546,394 A | * | 8/1996 | Eaton et al. ................ 370/476 |
| 5,625,876 A | | 4/1997 | Gilhousen et al. |
| 5,933,462 A | | 8/1999 | Viterbi et al. |
| 6,088,335 A | * | 7/2000 | I et al. ....................... 370/252 |
| 6,389,016 B1 | * | 5/2002 | Sabaa et al. ................ 370/389 |
| 6,563,884 B1 | * | 5/2003 | Nikula ....................... 375/295 |
| 6,574,211 B1 | * | 6/2003 | Padovani et al. ........... 370/347 |
| 6,574,668 B1 | * | 6/2003 | Gubbi et al. ................ 709/237 |
| 6,636,500 B1 | * | 10/2003 | Krishnamoorthy et al. . 370/347 |
| 2003/0179719 A1 | * | 9/2003 | Kobayashi et al. ......... 370/282 |

FOREIGN PATENT DOCUMENTS

| | | |
|---|---|---|
| WO | 9849796 | 11/1998 |
| WO | 9923844 | 5/1999 |

OTHER PUBLICATIONS

Ding, Q.L. "An Effective Hybrid Multilevel Error Control Scheme For Wireless ATM Networks" IEEE Global Telecommunications Conference, New York 3:1828–1833 (1998).

* cited by examiner

*Primary Examiner*—Wellington Chin
*Assistant Examiner*—Chuong Ho
(74) *Attorney, Agent, or Firm*—Philip Wadsworth; Sandra L. Godsey; Byron Yafuso

(57) ABSTRACT

In a high data rate communication system, a method and apparatus for improved throughput while transmitting data packets within multiple time slots. In order to avoid unnecessary retransmissions of a packet, a subscriber station sends a Stop-Repeat signal to a base station, causing the base station to cease further transmissions of the packet. In order to enable successful decoding of a packet, a subscriber station sends a Continue-Repeat signal to a base station, causing the base station to send retransmissions of the packet during time slots beyond a predetermined default number of time slots.

71 Claims, 8 Drawing Sheets

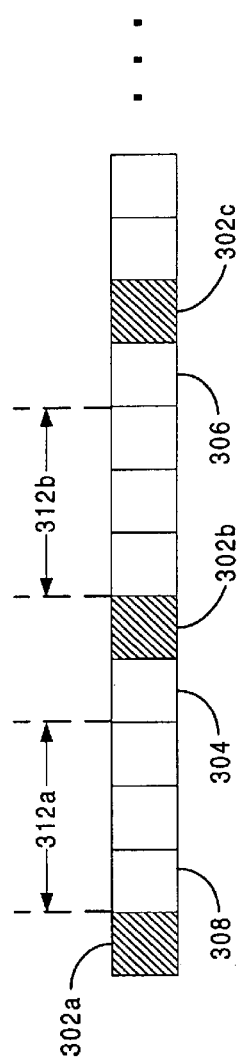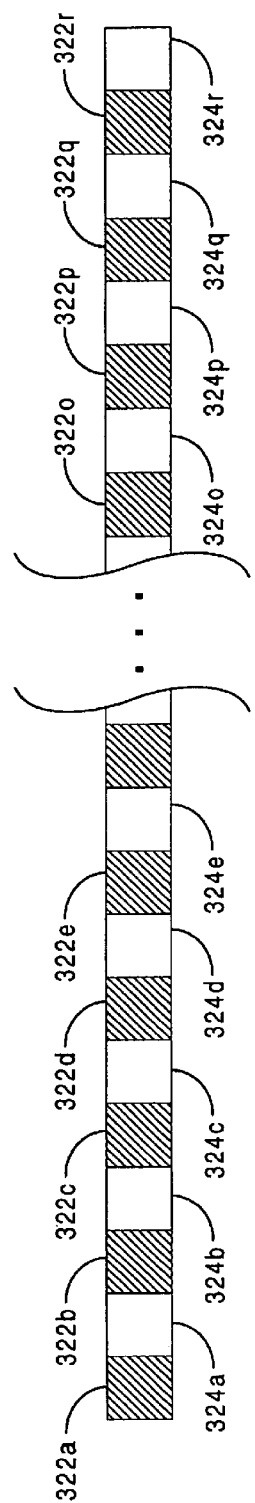
FIG. 3a
FIG. 3b

METHOD AND APPARATUS FOR ADAPTIVE TRANSMISSION CONTROL IN A HIGH DATA RATE COMMUNICATION SYSTEM

BACKGROUND OF THE INVENTION

I. Field of the Invention

The current invention relates to wireless data communication. More particularly, the present invention relates to a novel and improved method and apparatus for high rate packet data transmission in a wireless communication system.

II. Description of the Related Art

A modern day communication system is required to support a variety of applications. One such communication system is a code division multiple access (CDMA) system which conforms to the "TIA/EIA-95 Mobile Station-Base Station Compatibility Standard for Dual-Mode Wideband Spread Spectrum Cellular System" and its progeny, hereinafter referred to as IS-95. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein.

In a CDMA system, communications between users are conducted through one or more base stations. In wireless communication systems, forward link refers to the channel through which signals travel from a base station to a subscriber station, and reverse link refers to channel through which signals travel from a subscriber station to a base station. By transmitting data on a reverse link to a base station, a first user on one subscriber station communicates with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a terrestrial internet through a connection with a serving base station. In wireless communications such as those conforming to IS-95, forward link and reverse link signals are transmitted within disjoint frequency bands.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in copending U.S. Pat. No. 5,625,876, entitled "METHOD AND APPARATUS FOR PERFORMING HANDOFF BETWEEN SECTORS OF A COMMON BASE STATION", assigned to the assignee of the present invention and incorporated by reference herein Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Patent No. 5,504,773, entitled "METHOD AND APPARATUS FOR THE FORMATTING OF DATA FOR TRANSMISSION", assigned to the assignee of the present invention and incorporated by reference herein. In accordance with the IS-95 standard, the traffic data or voice data is partitioned into code channel frames that are 20 milliseconds wide with data rates as high as 14.4 Kbps.

A significant difference between voice services and data services is the fact that the former imposes stringent and fixed delay requirements. Typically, the overall one-way delay of speech frames must be less than 100 milliseconds. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS", assigned to the assignee of the present invention and incorporated by reference herein.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmissions from two or more base stations to improve reliability. However, this additional reliability is not required for data transmission because the data packets received in error can be retransmitted. For data services, the transmit power used to support soft handoff can be more efficiently used for transmitting additional data.

Transmission delay required to transfer a data packet and the average throughput rate are two attributes used to define the quality and effectiveness of a data communication system. Transmission delay does not have the same impact in data communication as it does for voice communication, but it is an important metric for measuring the quality of the data communication system. The average throughput rate is a measure of the efficiency of the data transmission capability of the communication system. There is a need in the art for communication systems that provide improved data throughput while simultaneously providing a GOS that is appropriate for wireless packet data services.

SUMMARY OF THE INVENTION

The present invention is directed to a novel and improved method and apparatus for high rate packet data transmission in a CDMA system. An exemplary system for transmitting high rate digital data in a wireless communication system is disclosed in copending U.S. patent application Ser. No. 08/963,386, entitled "METHOD AND APPARATUS FOR HIGHER RATE PACKET DATA TRANSMISSION," (hereafter the '386 application) assigned to the assignee of the present application and incorporated by reference herein. The present invention advantageously improves the throughput of a high data rate CDMA system by minimizing unnecessary retransmissions of packet data within transmit time slots after successful decoding of the associated packet data by a destination network node such as a wireless subscriber station.

It is an aspect of the present invention to improve the data throughput of a high data rate system such as that described in the '386 application. In an exemplary aspect, a destination network node such as a subscriber station sends a data rate control (DRC) signal to a source network node such as a base station on a data rate control (DRC) channel. Based on the DRC signal, the base station chooses a data rate at which packets of data are sent to the subscriber station on the forward link. The information in the DRC signal is based on carrier-to-interference (C/I) measurements that the subscriber station performs on previous forward link signals received from the base station. In an exemplary aspect, the subscriber station chooses a data rate that will ensure that the packet error rate (PER) will not exceed a predetermined target PER and specifies that data rate in the DRC signal. As the characteristics of the forward link channel change over time, the subscriber station adjusts the DRC signal accordingly.

In an exemplary aspect of the invention, the base station sends data to the subscriber station at the data rate specified by the DRC signal most recently received from the subscriber station. The base station sends packets of data to a plurality of subscriber stations using fixed-duration forward link time slots. In an exemplary aspect, the base station sends data to only one of the plurality of subscriber stations during each forward link time slot.

If the data rate specified by the DRC signal of a destination subscriber station is sufficiently small, the base station sends each packet of data within multiple forward link time slots. In an exemplary aspect, a 1024-bit packet of data may be transmitted at a rate of 38,400 bits-per-second (bps) within sixteen time slots, with each time slot having a duration of 1.67 milliseconds. In the exemplary aspect, the same packet of data may be alternatively sent at a rate of 76,800 bps within eight time slots. Accordingly, several other data rates are contemplated in the exemplary aspect, with a predetermined number of time slots associated with each data.

In an aspect of the invention, the forward link signal transmitted in each of the multiple time slots for a packet contains all of the data in the packet. In other words, the packet data is not divided among the multiple time slots. Instead, the entire packet of data is transmitted within each time slot. The lower the data rate indicated by the subscriber station's DRC request, the greater the number of time slots in which the packet must be repeated to maintain the target PER. For example, a DRC request of a data rate of 38,400 may require that the base station send a 1024-bit packet in sixteen time slots. The base station will then transmit the same 1024-bit packet during sixteen subsequent time slots. In an exemplary aspect, the base station uses puncturing techniques well known in the art to puncture a preamble into the signal transmitted during the first of multiple time slots associated with a multiple-slot packet. The subscriber station uses this preamble to determine whether the base station has begun transmitting a multiple-slot packet addressed to the subscriber station.

In an aspect of the invention, the multiple copies of a multiple-slot packet are sent within non-consecutive time slots. For example, a sixteen-slot packet may be sent in every other slot during a thirty-one-slot period. In another aspect of the invention, a sixteen-slot packet may be sent in every fifth slot of a sixty-five-slot period. In either aspect, the pattern of slots used to transmit frames of each rate is predetermined. All signals sent within the time slots associated with a single packet are transmitted at the same data rate. In other words, once the transmission of a multiple-slot packet has begun at a data rate, the rest of the time slots associated with that packet are transmitted at the same data rate. The subscriber station accumulates the data received during each of the associated time slots in order to successfully decode the packet data and distinguish it from the signal noise.

In an exemplary aspect, the base station may not increase the data rate of a multiple-slot packet once the first time slot of the packet has been transmitted. To avoid losing a multiple-slot packet when the forward link channel degrades, the data rates chosen for multiple-slot packets are very conservative. Often, if the forward link channel improves during the transmission of a multiple-slot packet, the destination subscriber station may successfully decode the packet before all of the multiple copies of the packet have been sent by the base station. The longer the period during which multiple-slot packets are transmitted, the greater is the probability that the C/I of the forward link will change and no longer match the subscriber station's requested DRC data rate. If the subscriber station successfully decodes the packet within less than the predetermined number of copies of the packet, transmitting the remaining copies of the packet is a waste of precious forward link bandwidth. In addition, if the forward link signal happens to fade during the transmission of a multiple-slot packet, then the data thus far accumulated for the packet might be prematurely discarded. Transmitting the packet for just one or two more slots might enable successful decoding and avoid wasting the signals transmitted in the previous time slots.

In an exemplary aspect, each packet has a sequence number, and packets that are not successfully received by a subscriber station are retransmitted by a higher protocol layer. However, the subscriber station discards the buffered samples from the first transmission of the packet before the first slot of the packet retransmission is received. For this reason, the subscriber station cannot combine the packet retransmissions by the higher protocol layer with samples buffered from the first attempt to transmit the packet. For example, suppose a multiple-slot packet is transmitted at a low rate in sixteen time slots. If the packet is not successfully decoded in those sixteen time slots, then the higher protocol layer retransmits the packet at some time in the future. If the retransmission occurs at the same data rate as the first attempt, then the retransmission may consume sixteen additional time slots, depending upon the data rate used for the retransmission. If, however, the subscriber station can request a few more time slots in the first attempt, then the packet might be successfully decoded within, for example, eighteen time slots. The net savings on the forward link would be fourteen time slots.

In an aspect of the invention, each forward link data rate is assigned a default number of time slots per packet. If the subscriber station successfully decodes a multiple-slot packet early (before it has received the default number of time slots), the subscriber station stops the base station from sending the rest of the time slots for the packet. The subscriber station accomplishes this by sending a Stop-Repeat signal to the base station. Upon receiving a Stop-Repeat signal, the base station ceases sending the packet in subsequent time slots.

In another aspect of the invention, if the subscriber station is unable to decode a multiple-slot packet from signals received in the default number of time slots, the subscriber station requests additional retransmissions of the packet from the base station. The subscriber station accomplishes this by sending a Continue-Repeat signal to the base station. Upon receiving a Continue-Repeat signal, the base station sends additional copies of the packet in one or more subsequent time slots in addition to the default number of time slots.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 3a and 3b are diagrams of exemplary sequences of forward link time slot transmissions.

DETAILED DESCRIPTION OF PREFERRED EMBODIMENTS

Figure 1:
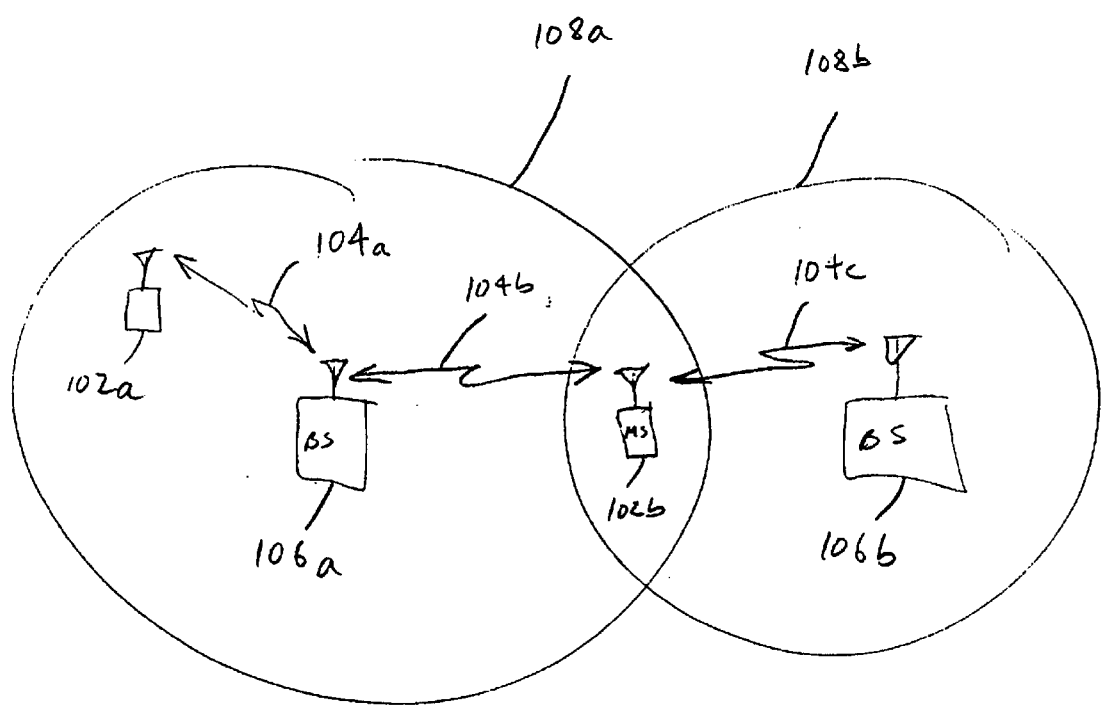
FIG. 1 is a diagram of an exemplary wireless communication system.

FIG. 1 shows a first wireless base station 106a transmitting to subscriber stations within a coverage area 108a and a second wireless base station 106b transmitting to subscriber stations within a coverage area 108b that overlaps with coverage area 108a. Subscriber station 102a is located within coverage area 108a but not coverage area 108b. Subscriber station 102b is located within both coverage area 108a and coverage area 108b. Base station 108a transmits data to subscriber station 102a through communication channel 104a and to subscriber station 102b through communication channel 104b. Base station 108b transmits data to subscriber station 102b through communication channel 104c.

In an exemplary embodiment, each subscriber station 102 generates a signal quality metric based on signals received from base stations 106. A subscriber station 102b receiving forward link signals from multiple base stations 106 identifies the base station associated with the received signal having the highest quality metric (for example base station 106b). The subscriber station 102b generates a prediction of a data rate at which the packet error rate (PER) of packets received from the selected base station 106b will not exceed a target PER. An exemplary embodiment uses a target PER of approximately 2%.

In an exemplary embodiment, the subscriber station 102b computes a rate at which the "tail probability" is greater than or equal to the target PER. The tail probability is the probability that the actual signal quality during the packet transmission period is less than the signal quality required for successful decoding of a packet correctly at a requested rate. Subscriber station 102b then sends a data rate control (DRC) signal based on the predicted tail probabilities to the selected base station 106b. In an exemplary embodiment, the tail probability is computed using signal quality attributes such as the carrier-to-interference (C/I) ratio of previous received signals. Based on previous measurements of signal quality, the subscriber station generates a prediction of the probably signal quality during the time slots used to transmit the next packet.

In an exemplary embodiment, each DRC signal sent by a subscriber station 102b is addressed specifically to one selected base station 106b. The selected base station 106b is then the only base station which may transmit traffic channel data to the subscriber station 102b during a subsequent time slot associated with the DRC signal. In an exemplary embodiment, the DRC signal indicates a requested data rate at which a specific selected base station may transmit forward link data to the subscriber station 102b during a specific future time slot. Because the selected base station 106b is the only base station that may "serve" the subscriber station 102b during the specific future time slot, the selected base station is referred to as a "serving base station." In an exemplary embodiment, the subscriber station 102b identifies the serving base station 106b by encoding the DRC signal using a specific Walsh code associated with the selected base station 106b. Because the subscriber station 102b uses a different orthogonal Walsh code to encode DRC signals to each different base station, no base station can decode a DRC signal that is meant for a different base station.

In an alternate embodiment, the DRC signal specifies one of a predetermined set of data rates at which the base station 106b may send forward link data to the subscriber station 102b. The data rate specified in the DRC signal is selected from the predetermined set of data rates based on previous measurements of signal quality metrics. The data rate is selected such that the predicted TAIL PROBABILITY for a packet at that rate will be less than or equal to the target TAIL PROBABILITY. In an exemplary embodiment, the DRC signal specifies one of thirteen possible data rates, though the number of possible data rates may vary. The DRC signal encodes the selected data rate into a four-bit signal transmitted on a DRC channel. In an exemplary embodiment, the DRC channel is orthogonal to the reverse link data channel. The reverse link data and pilot channels are orthogonally spread by 4-ary Walsh functions $W_2^4$ and $W_0^4$, respectively, as defined in Table 1 below:

TABLE 1

4-ary Walsh Functions

| | |
|---|---|
| $W_0^4$ | 0000 |
| $W_1^4$ | 0101 |
| $W_2^4$ | 0011 |
| $W_3^4$ | 0110 |

In an exemplary embodiment, base station 106b monitors DRC signals from one or more subscriber stations and transmits forward link data to no more than one destination subscriber station during each forward link transmit time slot. Base station 106b selects the destination subscriber station (for example subscriber station 102b) based on a scheduling procedure designed to balance the quality of service (QOS) requirements of each subscriber station with the desire to maximize throughput of the system. In an exemplary embodiment, base station 106b transmits data to the destination subscriber station 102b only at the rate indicated by the most recent DRC signal received from the destination subscriber station. This restriction makes it unnecessary for the destination subscriber station 102b to perform rate detection on the forward link signal. Subscriber station 102b need only determine whether it is the intended destination subscriber station during a given time slot.

In an alternative embodiment, base station 106b may transmit forward link packets at a different rate than indicated by the DRC signal received from the destination subscriber station 102b. In an exemplary embodiment, base station 106b sends a data rate signal on the forward link that is used by subscriber stations to decode the corresponding forward link packets. In an alternative embodiment, base station 106b just sends the forward link packet, requiring the destination subscriber station 102b to perform blind rate determination while decoding the packet.

In an exemplary embodiment, the base station transmits a preamble within the first time slot of each new forward link packet. The preamble identifies the intended destination subscriber station. In an exemplary embodiment, the base station assigns one of a set of 32 possible Walsh codes to each active subscriber station in its cell. The Walsh codes assigned to each active subscriber station are unique within the cell. In other words, no two subscriber stations are assigned the same Walsh code for the same cell at the same time. The preamble of each packet is covered with the Walsh code assigned to the destination subscriber station. This Walsh cover identifies the intended destination subscriber station for each packet. In an exemplary embodiment, only the first of multiple slots containing data for a single packet is transmitted with a preamble. In an exemplary embodiment, the preamble is punctured into the forward link packet data.

In an exemplary embodiment, once a destination subscriber station establishes that it is the intended destination for data in a slot, the subscriber station begins decoding the data in the associated time slot. In an exemplary embodiment, the destination subscriber station 102b determines the data rate of the data in the forward link time slot based on previous DRC signals sent by the destination subscriber station 102b. As described above, the destination subscriber station 102b may alternatively determine the rate based on a forward link data rate signal or on blind rate detection.

In an exemplary embodiment, base station 106b transmits the data for a single packet using a single data rate. In other words, if a packet is transmitted within sixteen time slots, the forward link data rates in each of those time slots will be equal to each other.

In an exemplary embodiment, the number of forward link time slots used to transmit a packet varies based on the data rate at which the packet is sent. Packets sent at a lower rate are sent using a greater number of time slots. An exemplary set of data rates and associated numbers of forward link time slots is listed in Table 2.

TABLE 2

Forward Data Channel Modulation Parameters

| Data rate (kbps) | Bits/Packet | Slots/Packet |
|---|---|---|
| 38.4 | 1024 | 16 |
| 76.8 | 1024 | 8 |
| 102.4 | 1024 | 6 |
| 153.6 | 1024 | 4 |
| 204.8 | 1024 | 3 |
| 307.2 | 1024 | 2 |
| 614.4 | 1024 | 1 |
| 921.6 | 3072 | 2 |
| 1228.8 | 2048 | 1 |
| 1843.2 | 3072 | 1 |
| 2457.6 | 4096 | 1 |

In an exemplary embodiment, the destination subscriber station 102b decodes a preamble transmitted within the first slot of a multiple-slot packet to identify the beginning of a new packet transmission from base station 106b. The data rate associated with the transmission of the new packet determines the maximum number of slots that will be used to carry the packet. In an exemplary embodiment, the subscriber station knows a priori which slots received after the preamble carry data associated with the same multiple-slot packet.

The signal received in a single slot by destination subscriber station 102b contains components of noise and interference as well as the data signal transmitted by base station 106b. By accumulating samples for a packet over multiple slots, destination subscriber station 102b takes advantage of the strong slot-to-slot correlation in the data signal compared to the weak slot-to-slot correlation in the interference and noise components. The samples accumulated over multiple slots eventually enable successful decoding of the packet. A multiple-slot packet is sent over a maximum number of time slots at a constant data rate. If the noise characteristics of the forward link channel improve after the first slot is sent, the destination subscriber station 102b may be able to successfully decode the packet before receiving the maximum number of time slots. Once the destination subscriber station 102b successfully decodes the packet, subsequent forward link time slots containing data for the decoded packet are discarded. In an exemplary embodiment, each packet includes a cyclic redundancy checksum (CRC) that enables the destination subscriber station to determine when the packet has been successfully decoded.

Another advantage of transmitting a packet over multiple time slots is that the received signal will have greater time diversity. In a dynamic fading environment, a packet that is transmitted over a short period of time can easily be lost to a relatively transient fade in the signal. However, if a packet is transmitted over a period of time that is longer than the duration of a fade, then the signal received outside of the fade period can allow successful decoding of the packet. The longer the transmission period of a packet, the lower are the chances that a fade will block the entire packet signal.

However, longer transmission periods also make it more difficult to accurately predict the signal quality over the entire transmission period. In an exemplary embodiment, feedback signals enable the system to take advantage of time diversity while suffering minimally for inaccurate predictions of tail probability.

In an exemplary embodiment, destination subscriber station 102b accumulates samples of a packet transmitted within the multiple time slots of a multiple-slot packet. After the samples of the first slot of the packet are received, the samples of subsequent slots containing data for the same packet are accumulated into a packet accumulation buffer. If the CRC of the contents of the packet accumulation buffer indicate receipt of an error-free packet, the destination subscriber station 102b declares the packet successfully decoded. In an exemplary embodiment, destination subscriber station 102b then sends a Stop-Repeat signal to base station 106b, indicating the successful decoding of the packet. Upon receiving the Stop-Repeat signal from destination subscriber station 102b, base station 106b terminates the transmission of that forward link packet. If fewer than the maximum number of time slots have been used to transmit the packet, the Stop-Repeat signal results in base station 106b using fewer than the maximum number of time slots to send the packet. For example, if base station 106b receives a Stop-Repeat signal after sending only eight slots of a sixteen-slot packet, then base station 106b sends no more slots containing data for that packet.

It is desirable to avoid sending the Stop-Repeat signal where it results in no change in the behavior of base station 106b. For this reason, in an exemplary embodiment, destination subscriber station 102b only sends the Stop-Repeat signal if it has received fewer than the maximum number of time slots containing data for a multiple-slot packet.

Figure 2:
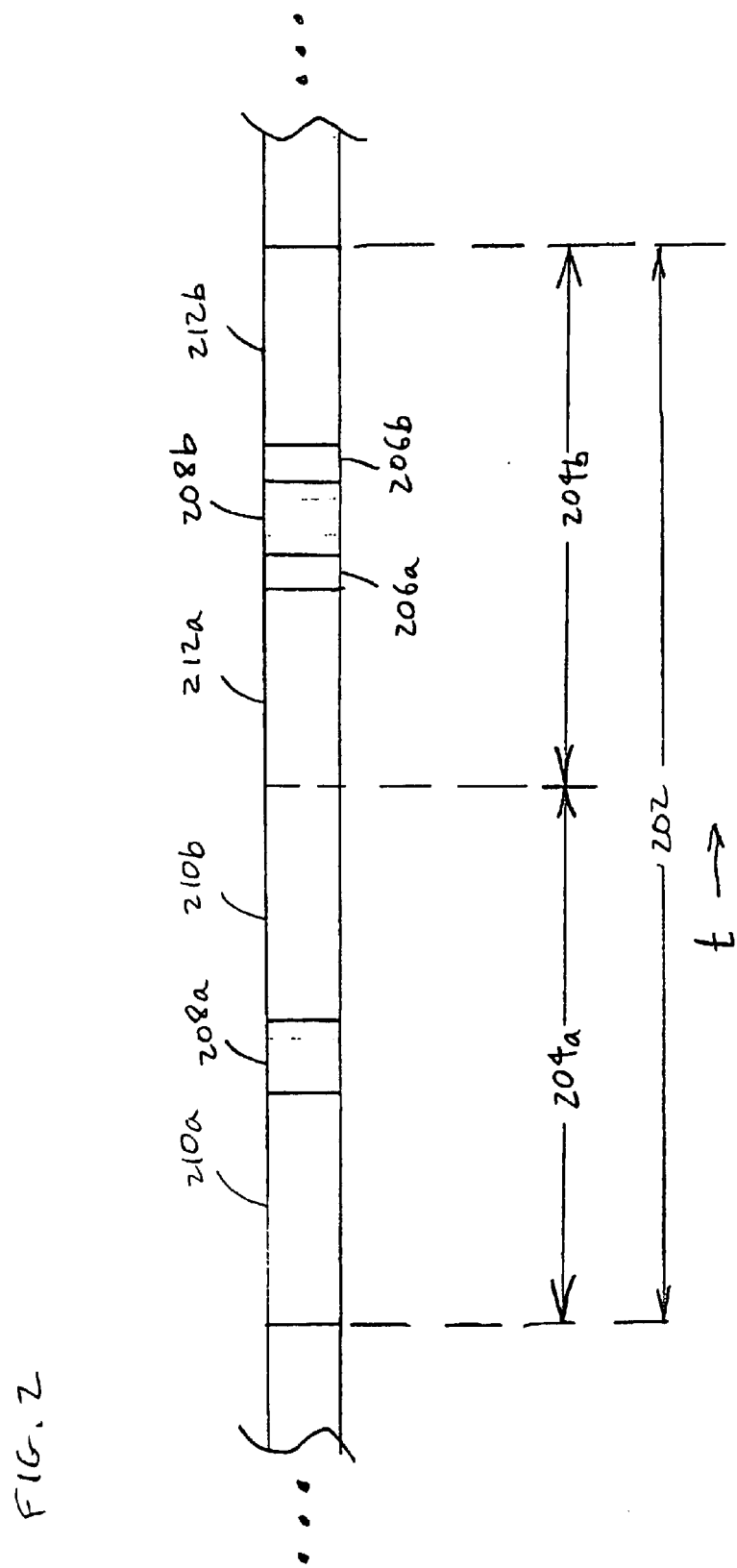
FIG. 2 is a diagram of an exemplary forward link signal structure.

FIG. 2 shows the forward link signal structure transmitted by each base station in an exemplary high data rate system. Forward link signals are divided into fixed-duration time slots. In an exemplary embodiment, each time slot is 1.67 milliseconds long. Each slot 202 is divided into two half-slots 204, with a pilot burst 208 transmitted within each half-slot 204. In an exemplary embodiment, each slot is 2048 chips long, corresponding to a 1.67 millisecond slot duration. In an exemplary embodiment, each pilot burst 208 is 96 chips long, and is centered at the mid-point of its associated half-slot 204. A reverse link power control (RPC) signal 206 is transmitted to either side of the pilot burst in every second half-slot 204b. In an exemplary embodiment, the RPC signal is transmitted in the 64 chips immediately before and the 64 chips immediately after the second pilot burst 208b of each slot 202, and is used to regulate the power of the reverse link signals transmitted by each subscriber station. In an exemplary embodiment, forward link traffic channel data are sent in the remaining portions of the first half-slot 210 and the remaining portions of the second half-slot 212.

In an exemplary embodiment, the pilot burst signals are transmitted continuously over an orthogonal code channel, similar to IS-95 systems. In an exemplary embodiment, the pilot burst signals are spread using a Walsh code $W_0$ (which is equivalent to no Walsh cover). In an exemplary embodiment, the pilot burst signals are used by subscriber stations for initial acquisition, phase recovery, timing recovery, and ratio combining. In an exemplary embodiment, the pilot burst signals are also used by subscriber stations to perform C/I measurements.

FIG. 3a is a diagram showing an exemplary arrangement of forward link slot transmissions. In an exemplary embodiment, a base station transmits a first slot of data 302a of a multiple-slot packet to a subscriber station. The samples associated with the first slot of data 302a are accumulated into a packet accumulation buffer in the subscriber station. After receiving the first slot of data for a packet, the subscriber station decodes a preamble from the first slot to identify the packet as addressed to the subscriber station. If the preamble is not successfully decoded, then the subscriber station searches for a preamble in the next time slot 308.

Upon determining that the first time slot 302a contains data for a packet addressed to the subscriber station, the subscriber station attempts to decode the received packet data from the data stored in the packet accumulation buffer. In an exemplary embodiment, the data rate of the packet is based on a DRC signal sent previously by the subscriber station and addressed specifically to the serving base station.

In an exemplary embodiment, each attempt to decode a packet from the contents of the packet accumulation buffer takes an additional number of slot periods shown as decoding period 312a. Though shown as three slots, decoding period 312a may vary. At the end of the decoding period 312a, the subscriber station checks the cyclic redundancy checksum (CRC) of the received forward link packet. If the CRC indicates that the packet was received without errors, then the destination subscriber station sends a Stop-Repeat signal to the serving base station during the next time slot 304. The base station, upon successfully decoding the Stop-Repeat signal, sends no further repeated transmissions of the same packet.

In an exemplary embodiment, a subscriber station can receive multiple packets in interlaced slots. For example, slot 302a might contain the first slot of a first multiple-slot packet for the subscriber station. In addition, during decoding period 312a and the next time slot 304, the subscriber station may receive the data for additional packets. For example, during the three slots shown as decoding period 312a, the subscriber station might receive the third slot of data for a second multiple-slot packet, the sixteenth slot of data for a second multiple-slot packet, and the first and only slot of data for a third packet. In addition, the subscriber station might receive a slot of data for a fourth packet during the following slot 304. The subscriber station stores the data for each separate packet into separate packet accumulation buffers. In an exemplary embodiment, wherein each multiple-slot packet is transmitted in forward link slots spaced five slots apart, a subscriber station has five packet accumulation buffers to decode as many as five packets at a time. In an exemplary embodiment, the five packets are not necessarily transmitted by the same serving base station. For example, a first serving base station may be sending the first two multiple-slot packets using time slots that are interlaced with time slots associated with three multiple-slot packets transmitted by a second serving base station.

After each slot prior to the maximum number of slots for a multiple-slot packet, the subscriber station attempts to decode the packet from the data accumulated in the corresponding packet accumulation buffer. In an exemplary embodiment, the process of decoding the contents of the packet accumulation buffer takes several slot periods shown as decoding period 312a. If, at the end of decoding period 312a, the packet has been successfully decoded, the subscriber station sends a Stop-Repeat signal to the serving base station. The Stop-Repeat signal is transmitted during the time slot 304 immediately following the decoding period 312a. After sending a Stop-Repeat signal, the subscriber station searches for a subsequent packet beginning in time slot 302b.

If the packet is not successfully decoded from the received signal of the first time slot 302a, then the serving base station transmits the data of the packet in a second time slot 302b. If the serving base station never receives a Stop-Repeat signal, the serving base station will continue to transmit the packet in every fifth time slot. The serving base station stops transmitting the packet after the maximum number of time slots associated with the transmit data rate has been reached. Meanwhile, the destination subscriber station accumulates data received during the different time slots of a multiple-slot packet into a packet accumulation buffer. For example, after the first data of a packet is received in a first time slot 302a the data is accumulated into a previously clear packet accumulation buffer. When the next set of data for the same packet is received during time slot 302b, the received data is accumulated into the same packet accumulation buffer along with the data from the first slot 302a. The data for the same packet is transmitted again in time slot 302c, and the data is again accumulated into the packet accumulation buffer along with the data from previous time slots 302a and 302b.

After each time slot associated with the multiple-slot packet 302, the subscriber station attempts to decode the packet from the contents of the packet accumulation buffer. If the subscriber station successfully decodes the packet after a decoding period 312, the subscriber station sends a Stop-Repeat signal during the time slot immediately following the decoding period 312 in which the packet was decoded. In an exemplary embodiment, an exception to this rule exists when the packet is decoded after receiving the maximum number of time slots for the packet. The Stop-Repeat signal is not sent after the maximum number of time slots for a packet have been received, whether or not the packet was successfully decoded.

In an exemplary embodiment, a base station transmits at low data rates using multiple-slot packets. In order for the base station to direct the full forward link capacity to a subscriber station using a low data rate, the base station must send five multiple-slot packets at a time. In an alternate embodiment, the subscriber station has fewer packet accumulation buffers than the number of slots in decoding period 312a and the following slot 304. This decreases the number of simultaneous packets that the subscriber station can receive, but saves memory in the subscriber station.

If the base station does not receive a Stop-Repeat signal in time slot 304, then the base station transmits the packet in the time slot 302b immediately following time slot 304. The base station's failure to decode a Stop-Repeat signal could mean either that the subscriber station did not send a Stop-Repeat signal or that the Stop-Repeat signal was lost to communication error. In the latter case, the base station may end up transmitting the packet in more time slots than needed for successful decoding by the subscriber station. For example, if the base station sends a sixteen-slot packet that is successfully decoded by the subscriber station after the first slot, the destination subscriber station will send a Stop-Repeat signal to the base station. If the base station does not successfully decode the Stop-Repeat signal, then the base station will send the remaining fifteen slots of the packet, resulting in undesirable waste of forward link bandwidth.

Several approaches are contemplated to minimize the probability that a Stop-Repeat signal is lost to communication error. In an exemplary embodiment, a subscriber station transmits the Stop-Repeat signal using the Walsh code channel otherwise used to transmit the DRC signal. In an exemplary embodiment, eleven data rates are encoded into a four-bit signal on the DRC channel. The number of data rates is less than the sixteen possible four-bit DRC code words, leaving some code words available for other uses. In an exemplary embodiment, the Stop-Repeat signal is sent as one of the unused DRC code words. In an exemplary embodiment, the Stop-Repeat signal is transmitted through the Pilot/DRC channel using greater power than Pilot and DRC signals to improve decoding reliability of the Stop-Repeat signal.

In an alternate embodiment, the pilot signal and DRC signals are transmitted at the same time as the Stop-Repeat bit. The Stop-Repeat bit is transmitted using a different orthogonal Walsh function than the reverse link data signals and the pilot and DRC signals. In an exemplary embodiment, the reverse link data, the pilot/DRC channel, and the Stop-Repeat signal are orthogonally spread by 4-ary Walsh functions $W_2^4$, $W_0^4$, and $W_3^4$, respectively, as defined in Table 1 above.

FIG. 3b is a diagram showing a pattern of forward link slot transmissions in accordance with an alternate embodiment. The subscriber station monitors the signal quality of the pilot burst data and uses the signal quality information to predict whether the accompanying data in the slot can be correctly decoded. For example, the subscriber station monitors the pilot burst signal quality in a first slot 322a of a multiple-slot packet to determine whether the packet can be successfully decoded. If the subscriber station determines that the packet can probably be successfully decoded, the subscriber station sends a Stop-Repeat signal in the immediately following time slot 324a. In an exemplary embodiment, the Stop-Repeat signal may be sent before the packet has been completely decoded.

In an exemplary embodiment, the subscriber station accumulates data received in the first slot 322a into a packet accumulation buffer and tries to decode a packet preamble from the signal. Based on the preamble, the subscriber station identifies time slot 322a as the first slot of a multiple-slot packet addressed to the subscriber station. In an exemplary embodiment, the subscriber station analyzes the quality of the pilot burst data received in time slot 322a. The pilot burst quality information is then used to predict whether the packet data in time slot 322a can be successfully decoded.

In an exemplary embodiment, the pilot burst signal quality information from subsequent time slots associated with the same packet is combined to form a new prediction of whether the packet can be reliably decoded. For example, a subscriber station may receive a first transmission of a multiple-slot packet in a first time slot 322a. If the subscriber station does not send a Stop-Repeat signal in time slot 324a, the serving base station will send the second transmission of the multiple-slot packet in time slot 322b. The subscriber station will combine signal quality information generated from pilot bursts in the first slot 322a with signal quality information generated from pilot bursts in the second slot 322b. This process continues with the third slot of the multiple-slot packet 322c and so forth until the serving base station has transmitted the maximum number of slots for the multiple-slot packet. After each new slot of a multiple-slot packet is received, the subscriber station uses the cumulative pilot burst signal quality information to generate a new prediction of whether the packet can be successfully decoded. If it is determined that the packet can be successfully decoded, then the subscriber station sends a Stop-Repeat signal in the nearest reverse link time slot to the serving base station. After sending the Stop-Repeat signal, the subscriber station begins looking for the beginning of a new packet in subsequent forward link time slots.

In an exemplary embodiment, a multiple-slot packet is sent during every other time slot. In order to accumulate multiple-slot packets in every forward link time slot, a subscriber station needs only two separate packet accumulation buffers. This lesser number of packet accumulation buffers is desirable, because it reduces the cost of building the subscriber station.

In an exemplary embodiment, the destination subscriber station uses the second half-slot of a first time slot 322a to evaluate the signal quality of the pilot burst received during the first half-slot of the first time slot 322a. In an exemplary embodiment, this is necessary to allow time to determine whether to send a Stop-Repeat signal during the next time slot 324a. A Stop-Repeat signal sent in time slot 324a will be based on pilot burst signal quality information from the pilot burst in the first half-slot, but not the pilot burst in the second half-slot of time slot 322a. If no Stop-Repeat signal is sent in time slot 324a, then signal quality information from three pilot burst periods is analyzed in the second half-slot of time slot 322b to determine whether to send a Stop-Repeat signal during time slot 324b. The pilot burst periods analyzed during the second half-slot of time slot 322b include both pilot bursts received during time slot 322a and the pilot burst from the first half-slot of time slot 322b. Likewise, pilot burst data from five pilot bursts are analyzed during time slot 322c, with two additional pilot bursts being analyzed in each subsequent time slot associated with the same multiple-slot packet. In an alternate embodiment in which faster processors are used, both pilot bursts of each new time slot are used to determine whether to send a Stop-Repeat signal in the following time slot.

In an exemplary embodiment, analyzing the pilot burst signal quality takes less time than actually decoding the contents of the packet. For this reason, the subscriber station may send the Stop-Repeat signal in the time slot 324a immediately after the slot 322a containing the packet data. One disadvantage with this approach is that inaccurate predictions can waste bandwidth. For example, the subscriber station might predict that a packet can be successfully decoded based on the quality of the pilot burst signal. The subscriber station would then send a Stop-Repeat signal to the serving base station based on that prediction. After receiving the Stop-Repeat signal, the base station will not send data for that packet in any more time slots. If the prediction turns out to be inaccurate and the packet cannot be successfully decoded, then all forward link time slots previously used for that packet will have been wasted.

In an exemplary embodiment, signal quality information for multiple pilot bursts is cumulatively analyzed to generate a decoding prediction metric. In an exemplary embodiment, all but the pilot burst in the last half-slot are analyzed to generate the decoding prediction metric. In an exemplary embodiment, each forward link time slot is divided into two half-slots. Each half-slot has one pilot burst, transmitted at the center of the half-slot. The pilot burst information generates the decoding prediction metric by adding the C/I values generated over each pilot burst. The decoding prediction metric is then compared with a decoder prediction threshold. If the decoding prediction metric is greater than or equal to the decoding prediction threshold, then the subscriber station sends a Stop-Repeat signal to the serving base station.

Either an unnecessarily high or an unnecessarily low decoder prediction threshold value can lead to system inefficiency. For example, if the decoder prediction threshold is too low, then the subscriber station will incorrectly predict that a packet can be successfully decoded. After sending a Stop-Repeat signal, the subscriber station will not be able to decode the packet from the data received in previous time slots. The data received in previous time slots will be lost. On the other hand, if the decoder prediction threshold is too high, then the subscriber station will incorrectly predict that a packet cannot be successfully decoded from the data received in previous time slots. Because the subscriber station will not send a Stop-Repeat signal, it will receive an additional time slot of data that it doesn't need. The bandwidth used to send the unneeded time slot will be wasted. In an exemplary embodiment, the decoder prediction threshold is chosen to balance the cost of incorrect predictions in either direction. In addition, the decoder prediction threshold may be modified over time to compensate for a changing signal propagation environment.

In an alternate embodiment, the serving base station transmits a multiple-slot packet in every other time slot, and the subscriber station performs full decoding before sending the Stop-Repeat signal. For example, if the decoding period is two time slots long, then the signal received in the first time slot 322a will not be decoded until the end of time slot 322b. By the time the subscriber station decodes the first time slot 322a of the packet, the next time slot 322b for the packet will already have been received. After decoding of the first time slot 322a has begun, the subscriber station accumulates the data received for the same packet in the next time slot 322b into the same packet accumulation buffer. If the subscriber station correctly decodes the packet from the signal received in the first time slot 322a, then the subscriber station sends a Stop-Repeat signal during the next time slot 324b. In this event, the bandwidth used to send the copy of the packet within the second time slot 322b will have been wasted. If the packet is correctly decoded after receiving and accumulating the fourth slot 322d of data for the packet, then the subscriber station sends a Stop-Repeat signal during the slot 324e following the decoding period. In an exemplary embodiment, multiple-slot packets are sent in every other time slot, the subscriber station does full decoding after each packet time slot, and at most one time slot of data is wasted.

In an exemplary embodiment, the subscriber station does not send a Stop-Repeat signal after the maximum number of time slots have been received for a packet. This is true even if the subscriber station successfully decodes a multiple-slot packet after accumulating data in the second-to-last time slot of the packet. It is not necessary for the subscriber station to consume reverse link bandwidth telling the serving base station to stop repeating the packet when the serving base station would stop at that time anyway.

In another alternate embodiment, the subscriber station combines two of the techniques described above. The subscriber station performs pilot burst signal quality analysis and, if the decoding prediction metric is greater than or equal to the decoding prediction threshold, then the subscriber station sends a Stop-Repeat signal to the serving base station. In parallel with analyzing the quality of received pilot burst signals, the subscriber station performs full decoding of received time slot data.

In an exemplary embodiment, multiple-slot packets are sent in every other time slot, and the decoding period is two time slots. The subscriber station receives the first slot of a multiple-slot packet in time slot 322a and stores the received data into a packet accumulation buffer. The subscriber station analyzes the quality of the pilot burst signal received in the time slot 322a and generates a decoding prediction metric. If the decoding prediction metric is greater than or equal to the decoding prediction threshold, then the subscriber station sends a Stop-Repeat signal in time slot 324a.

If the decoding prediction metric is less than the decoding prediction threshold, then the subscriber station does not send a Stop-Repeat signal in time slot 324a. The subscriber station also begins decoding the contents of the packet accumulation buffer. If the packet can be successfully decoded from the contents of the packet accumulation buffer, then the subscriber station sends a Stop-Repeat signal in the time slot 324b immediately following the decoding period. The subscriber station analyzes pilot burst data received in time slots 322a and 322b to determine whether to send a Stop-Repeat signal in time slot 324b. The pilot burst analysis continues in each slot until the maximum number of time slots for the packet have been received or until the subscriber station sends a Stop-Repeat signal. Likewise, the subscriber station accumulates the signals received during time slots 322a and 322b to determine whether to send a Stop-Repeat signal in time slot 324c. Each subsequent slot of data is accumulated into the packet accumulation buffer, and the data is decoded. If the packet is successfully decoded from the contents of the packet accumulation buffer before the maximum number of time slots for the packet, then the subscriber station sends a Stop-Repeat signal. As soon as the subscriber station sends a Stop-Repeat signal, whether based on pilot burst signal quality or successful decoding, the subscriber station begins looking for new frames in the next forward link time slot.

Occasionally, a packet is not successfully decoded even after repeating the packet over the maximum number of time slots associated with the packet's transmit data rate. In some cases, the packet might be decodable after retransmitting the frame in one or two additional time slots. For example, if a sixteen-slot packet cannot be successfully decoded from the packet accumulation buffer contents after sixteen slots, perhaps accumulating the packet data in a seventeenth slot would be just enough to make the packet decodable. If this were so, then the seventeenth slot might be worth expending to avoid wasting the previous sixteen slots already devoted to the packet. In an alternate embodiment, the subscriber station may request that a packet be repeated over a limited number of time slots after the maximum time slots have already been transmitted. For example, after receiving the last of sixteen time slots of a multiple-slot packet, the subscriber may request additional repeated transmissions of the packet from the serving base station.

In an exemplary embodiment, the subscriber station sends a Continue-Repeat signal to the serving base station to request that the data for a packet be retransmitted in an additional time slot. In an exemplary embodiment, the subscriber station may request as many as n/2 repeated transmissions of an n-slot packet in one-slot increments. For example, after receiving the last slot of a sixteen-slot packet in time slot 322p, the subscriber station may request as many as eight additional repetitions of the packet beyond time slot 322p. If the subscriber station is not able to decode the packet from data received in time slot 322p, the subscriber station sends a Continue-Repeat signal in the following time slot 324p. Upon receiving the Continue-Repeat signal transmitted during time slot 324p, the serving base station retransmits the packet in a seventeenth time slot 322q. This process continues until the subscriber station is unable to decode the packet after having requested and received the packet in a total of twenty-four time slots.

In an exemplary embodiment, the base station retransmits the packet in only one time slot after receiving a Continue-Repeat signal. For example, in order to receive a seventeenth retransmission of a packet in time slot 322q, the subscriber station must send a Continue-Repeat signal in time slot 324p. In order to receive an eighteenth retransmission of a packet in time slot 322r, the subscriber station must send another Continue-Repeat signal in time slot 324q. In an exemplary embodiment, the subscriber station may request half as many Continue-Repeats of a packet as the maximum number of slots for the multiple-slot packet. For example, the subscriber station may send as many as eight Continue-Repeat signals for a sixteen-slot packet.

Even when a subscriber station has received all the slots of a multiple-slot packet without being able to correctly decode the packet, the subscriber station should not necessarily send a Continue-Repeat signal. Based on the signal quality throughout the transmission period, the subscriber station can estimate the probability that the packet can be successfully decoded even after receiving several Continue-Repeat retransmissions. For example, the subscriber station can generate this estimate using signal quality information generated from pilot burst signals received from the serving base station. In an alternate embodiment, the subscriber station decides whether to send a Continue-Repeat signal after the last time slot of a multiple-slot packet based on this estimate. If the subscriber station predicts that the packet will most likely not be decodable even after receiving the maximum number of allowable Continue-Repeat retransmissions, then the subscriber station will not send a Continue-Repeat signal.

In an alternate embodiment, the first Continue-Repeat signal causes the serving base station to send a number multiple retransmissions of the packet. The number of multiple retransmissions of the packet depends upon the the maximum number of slots associated with the multiple-slot packet. For example, the first Continue-Repeat signal received in slot 324p by a serving base station after sending the sixteenth time slot 322p of a sixteen-slot packet causes the serving base station to retransmit the packet for an additional eight time slots. The subscriber station can cause the serving base station to send fewer than eight retransmissions of the packet by sending a Stop-Repeat signal. One of skill in the art will appreciate that the number of additional time-slots could be any fraction of the maximum number.

In an exemplary embodiment, the Stop-Repeat signal and the Continue-Repeat signal are sent using a spare DRC code word on the DRC channel. For example, if the first eleven code words of the 4-bit DRC channel signal are used to request each of the eleven data rates, then the twelfth DRC code word is used for sending Stop-Repeat and Continue-Repeat signals. The base station distinguishes Stop-Repeat signals from Continue-Repeat signals based upon time of receipt. For example, if the base station receives the twelfth DRC code word from the destination subscriber station before the last time slot of a multiple-slot packet has been transmitted, the base station recognizes it as a Stop-Repeat signal. If the base station receives the twelfth DRC code word from the destination subscriber station immediately after the last time slot of a multiple-slot packet has been transmitted, the base station recognizes it as a Continue-Repeat signal. As discussed above, the subscriber station may send the Stop-Repeat signals and Continue-Repeat signals at greater power than pilot signals or DRC rate requests. This is done to improve the reliability of receiving the Stop-Repeat signals and Continue-Repeat signals at the base station.

In an alternate embodiment, Stop-Repeat and Continue-Repeat signals are sent using different spare DRC code words on the DRC channel. For example, the first eleven code words of the 4-bit DRC channel signal are used to request eleven data rates. One of the remaining five DRC code words is used for sending Stop-Repeat signals and a different one of the remaining four DRC code words is used to send Continue-Repeat signals.

The Stop-Repeat and Continue-Repeat signals consume reverse link bandwidth, and therefore impact reverse link capacity. For this reason, the transmission of Stop-Repeat and Continue-Repeat signals is advantageously minimized in the system. Because each base station transmits to no more than one destination subscriber station at a time, no more than one subscriber station per cell can send either a Stop-Repeat or a Continue-Repeat signal. Also, a subscriber station does not send a Stop-Repeat and Continue-Repeat signal to a base station unless it will change the behavior of the base station. For example, a subscriber station does not send a Stop-Repeat signal after the last time slot of a multiple-slot packet, because the base station will stop transmitting the packet even without receiving the Stop-Repeat signal. Similarly, the subscriber station will not send a Continue-Repeat signal if the base station would otherwise continue transmitting copies of a packet without receiving the Continue-Repeat signal.

In an alternate embodiment, the Continue-Repeat signal is sent using the negative value of the 4-ary Walsh function used to send the Stop-Repeat symbol. In an exemplary embodiment, the reverse link data is spread using 4-ary Walsh function $W_2^4$, as defined in Table 1 above. The pilot/DRC channel is spread using 4-ary Walsh function $W_0^4$, as defined in Table 1 above. In an exemplary embodiment, a +1 spread using 4-ary Walsh function $W_3^4$, as defined in Table 1 above indicates, a Stop-Repeat signal. A value of (-1) spread using 4-ary Walsh function $W_3^4$ (as defined in Table 1 above) indicates a Continue-Repeat signal. If neither a Stop-Repeat signal nor a Continue-Repeat signal is being sent, then no power is transmitted on the orthogonal channel distinguished by 4-ary Walsh function $W_3^4$, as defined in Table 1 above.

In an exemplary embodiment, the time slots of a multiple-slot packet are spaced at constant intervals. For example, in FIG. 3a, the different slots of a multiple-slot packet are shown as every fifth time slot. In FIG. 3b, the different slots of a multiple-slot packet are shown as every other time slot. At very low data rates, the likelihood that a packet will be successfully decoded in the first few time slots is generally very small. However, spacing out the time slots used to transmit a multiple-slot packet also stretches out the time that it takes to completely transfer the packet. It is desirable to minimize the total time necessary to transmit a multiple-slot packet. In an alternate embodiment, the serving base station sends the first slots of a multiple-slot packet consecutively. For example, the serving base station might send the first eight time slots of a sixteen-time-slot packet consecutively and then transmit the remaining time slots at five-slot intervals. In an exemplary embodiment, the serving base station sends the first n/2 time slots of an n-time-slot packet consecutively, and sends the remaining time slots at constant intervals. In alternate embodiments, other patterns of time slot usage for multiple-slot packets are also contemplated.

Figure 4A:
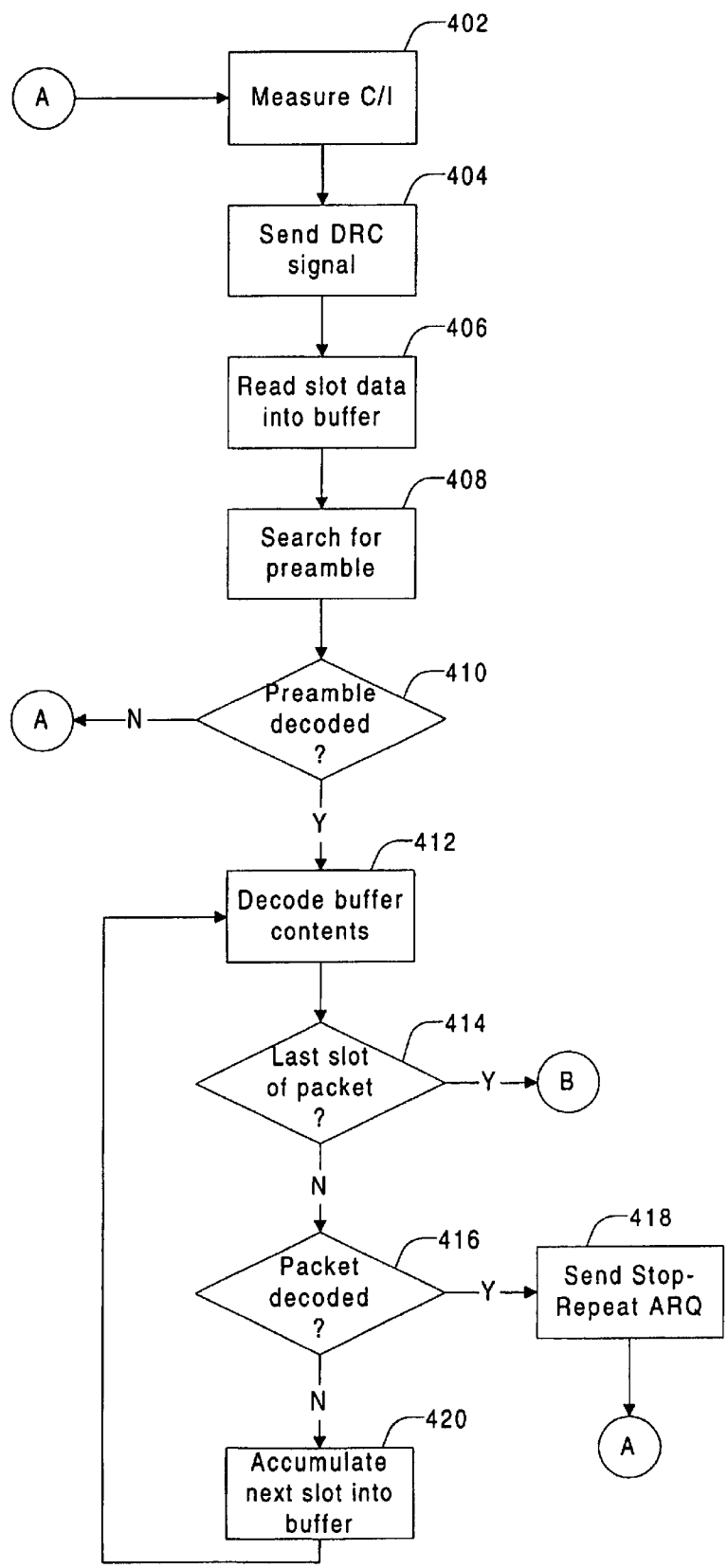
FIGS. 4a and 4b are a flowchart showing an exemplary method of receiving a multiple-slot packet.
Figure 4B:
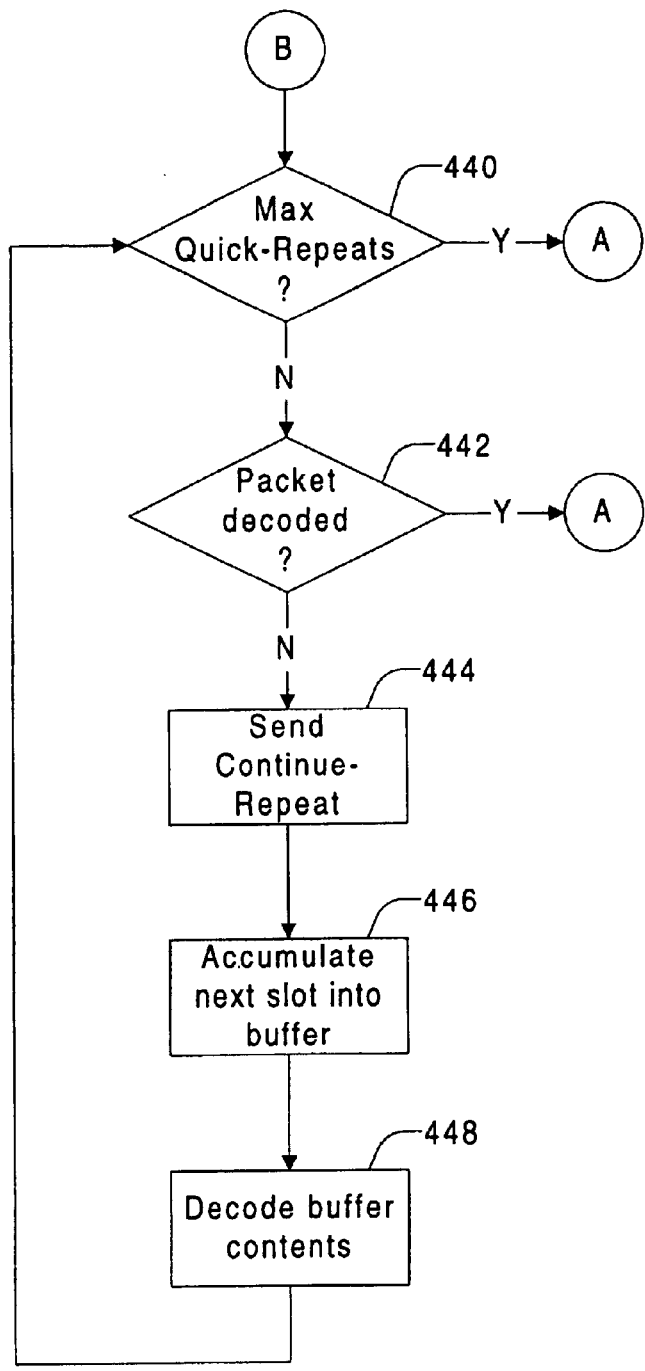

FIGS. 4A and 4B are an exemplary flowchart of a method for a subscriber station using Stop-Repeat to decode a forward link packet. At step 402, the subscriber station measures the C/I ratio of the forward link signal from each base station in the subscriber station's active set. Based on the measured C/I information, an exemplary subscriber station sends a DRC signal to a serving base station on a reverse link DRC channel. As described above, an exemplary subscriber station sends a DRC signal at step 404 that specifies one of a predetermined set of rates to be used in transmitting forward link data to the subscriber station. In an exemplary embodiment, the DRC signal sent at step 404 is based on measurements of C/I ratio performed during multiple forward link time slots.

During a forward link time slot following the sending of the DRC signal at step 404, the subscriber station reads the received forward link signal into a buffer at step 406. In an exemplary embodiment, the buffer is a packet accumulation buffer as described above. The subscriber station then attempts to decode a preamble from the contents of the buffer at step 408. In an exemplary embodiment, the serving base station inserts a preamble into the first slot of a packet transmission that only the intended destination subscriber station can decode.

If no preamble is decoded at step 408, then at step 410 the subscriber station requests a new packet again, starting with step 402. In an exemplary embodiment, the data rate of the packet must equal the data rate requested in the DRC signal sent at step 404. In an alternate embodiment, the data rate is encoded into the preamble of the packet, and is extracted at step 408. If at step 408 a preamble is decoded that indicates that the forward link time slot contains packet data addressed to the subscriber station, then the subscriber station analyzes the contents of the buffer at step 412.

In an exemplary embodiment, at step 412 the subscriber station attempts to completely decode the received packet from the contents of the buffer. In an alternate embodiment as described above, the subscriber station at step 412 analyzes the received signal quality of the pilot burst signals received during time slots associated with packet data in the buffer.

After analyzing the contents of the buffer at step 412, at step 414 the subscriber station determines whether the serving base station will send any more data for the packet. In an exemplary embodiment, the maximum number of time slots used to transmit a forward link packet depends on the data rate used to send the packet. In an exemplary embodiment, the serving base station sends a multiple-slot packet using no more than a maximum number of forward link time slots based on the data rate. At step 414, the subscriber station determines whether this maximum number of time slots has been used for the packet. If the maximum number of forward link time slots has already been used for the packet, then the subscriber station proceeds to step 440 to determine whether to send a Continue-Repeat message.

The processing performed at step 440 is advantageously similar or identical to the processing performed at step 416. If at step 440 the subscriber station determines that the packet has been successfully decoded, or will probably be successfully decoded based on pilot burst quality, then the subscriber station returns to step 402 to request the next packet. Otherwise, the subscriber station proceeds to step 442. At step 442, the subscriber station determines, based on the number of Continue-Repeat signals previously sent for the packet, whether to send a new Continue-Repeat signal requesting retransmission of the packet.

If at step 442 the subscriber station has not already sent the maximum allowable number of Continue-Repeat signals to the serving base station for the packet, then the subscriber station proceeds to step 444 and sends a Continue-Repeat signal. The maximum allowable number of Continue-Repeat signals may vary with data rate and number of slots in the multiple-slot packet. In an exemplary embodiment, a maximum of n/2 additional slots may be requested for an n-slot-packet. The Continue-Repeat signal may be sent using any of the techniques described above.

After sending the Continue-Repeat message at step 444, the subscriber station accumulates the next slot of data for the packet into the packet accumulation buffer at step 446. Then, the subscriber station attempts again to decode the contents of the packet accumulation buffer at step 448.

In an alternate embodiment, the subscriber station sends a maximum of one Continue-Repeat message per packet, after which it decodes a predetermined number of slots retransmitted by the serving base station. After sending one Continue-Repeat signal for a packet at step 444, the subscriber station sends no more Continue-Repeat signals for that packet. For example, after sending a Continue-Repeat signal at step 444, the subscriber station accumulates the next slot of data for the packet into the buffer at step 446 and decodes the buffer contents at step 448. If the packet is successfully decoded at step 442, then the subscriber station proceeds to step 442. If at step 440 the packet has been successfully decoded but the base station has not yet transmitted all of the retransmissions associated with the Continue-Repeat signal, then the subscriber station proceeds from step 440 to step 418 and sends a Stop-Repeat signal.

If the packet has not been successfully decoded at step 442, then the subscriber station determines at step 444 whether it has received all the retransmissions of the packet associated with the Continue-Repeat signal. If at step 444 the base station is expected to send more retransmissions of the packet in response to a previously transmitted Continue-Repeat signal, then the subscriber station proceeds from step 444 to step 446. Note that in the alternate embodiment, after the first Continue-Repeat message has been sent, the subscriber station skips step 442. The subscriber station continues to decode the retransmissions sent in response to the Continue-Repeat message until either the maximum number of retransmissions has been received or the packet is successfully decoded.

If at step 414 the maximum number of time slots has not yet been used for the packet, then the subscriber station evaluates whether the packet has been decoded at step 416. In an exemplary embodiment where full decoding of the buffer contents is performed at step 412, the subscriber station at step 416 evaluates whether the packet was successfully decoded. If the packet was not successfully decoded, then the subscriber station waits until the next forward link time slot associated with the packet and accumulates the received data into the buffer at step 420.

In an alternate embodiment where the signal quality of the received pilot burst data is analyzed at step 412, the subscriber station predicts at step 416 whether the packet can most likely be successfully decoded. This prediction is based on the signal quality of the received pilot burst information. If the subscriber station predicts that the packet cannot be successfully decoded, then the subscriber station waits until the next forward link time slot associated with the packet and accumulates the received data into the buffer at step 420.

At step 412, the subscriber station can perform full decoding, or may perform predictions of decoding success, or may do both in parallel. If, at step 416, the subscriber station determines that the packet either has been successfully decoded or can be successfully decoded, then the subscriber station sends a Stop-Repeat signal to the serving base station at step 418. The Stop-Repeat signal is sent using any of the techniques described above. After sending a Stop-Repeat signal at step 418, the subscriber station returns to step 402 to request the next packet.

FIGS. 4A and 4B show the process for receiving a single packet. As discussed above, a subscriber station may receive more than one multiple-slot packet at a time. For example, two multiple-slot packets may be received in alternating time slots. In an exemplary embodiment, a subscriber station uses the process shown in FIGS. 4A and 4B for each of potentially several multiple-slot packets using a different packet accumulation buffer for each. For example, steps 412 and 420 are performed on a first buffer associated with a first multiple-slot packet, and steps 412 and 420 are performed on a second buffer associated with a second multiple-slot packet.

Figure 5:
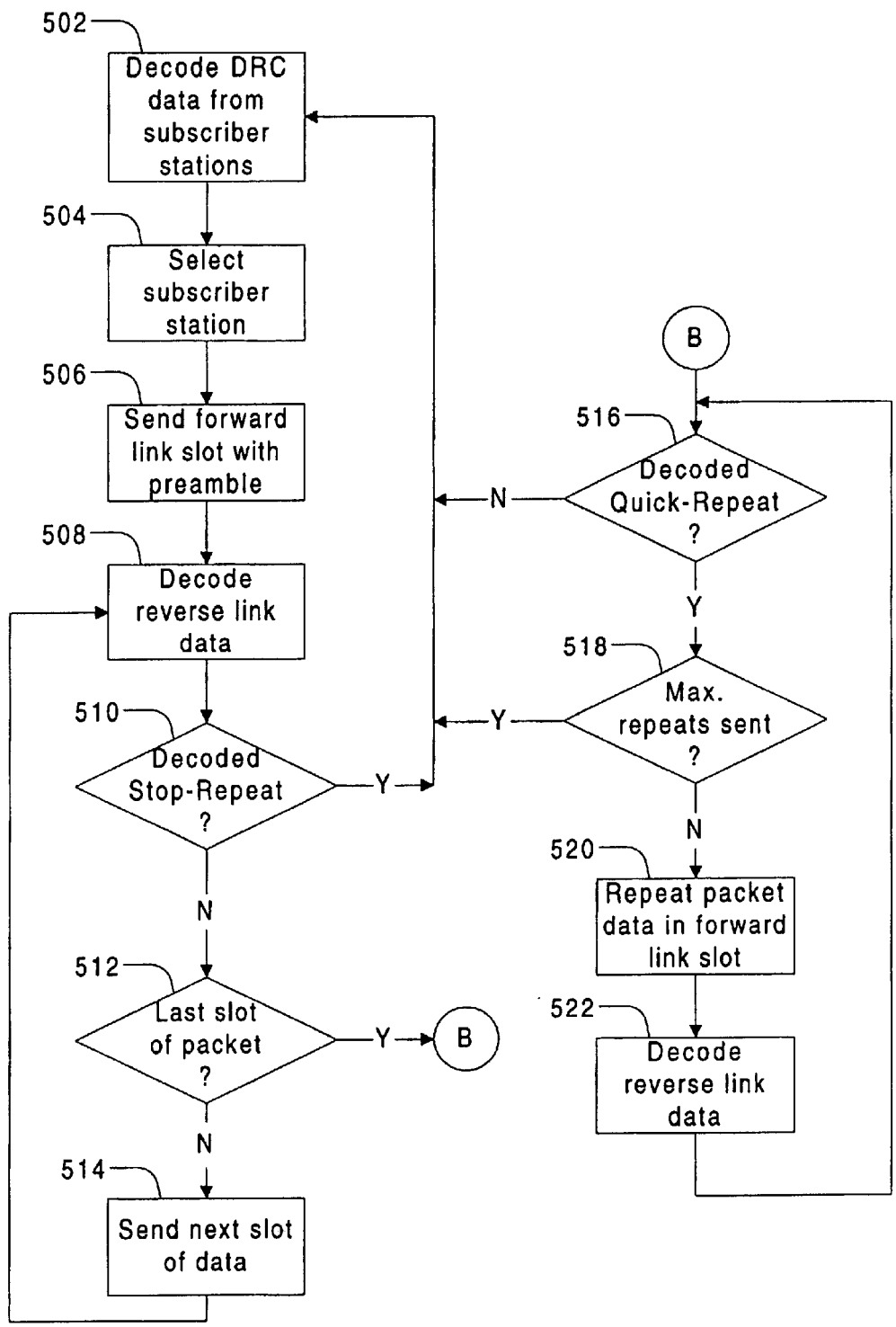
FIG. 5 is a flowchart showing an exemplary method of transmitting a multiple-slot packet.

FIG. 5 is an exemplary flowchart of a method used by a serving base station to transmit a forward link packet to a subscriber station. In an exemplary embodiment, the base station receives DRC signals from a plurality of subscriber stations at step 502. At step 504 the base station selects a destination subscriber station for transmission of a packet in the next forward link time slot. The serving base station then sends the first slot of data for the packet to the destination subscriber station at step 506.

In an exemplary embodiment, a preamble is transmitted within the first time slot associated with a new packet. The preamble enables identification of the intended destination subscriber station during decoding. The data rate at which the packet is sent is based on the DRC signal received from the destination subscriber station at step 502. If the data rate is small, then the packet (called a multiple-slot packet) of data is transmitted in multiple forward link time slots. In an exemplary embodiment, only the first time slot of the multiple-slot packet is transmitted with the preamble. The preamble could alternatively be transmitted in every forward link time slot.

After sending the first time slot of data for a packet at step 506, the base station decodes the signal received from the destination subscriber station at step 508. At step 510, the base station determines whether a Stop-Repeat signal was received from the destination subscriber station. If at step 510 a Stop-Repeat signal was received, then the base station proceeds to step 502 to select a new destination subscriber station for the next new packet. If at step 510 a Stop-Repeat signal was not received (perhaps sent but not successfully decoded), the base station proceeds to step 512. At step 512, the base station compares the number of time slots already used to send the packet with the number of time slots associated with the data rate of the packet. In an exemplary embodiment, each data rate has a number of time slots known as SLOTS_PER_PACKET that the base station will use for a packet without receiving mid-packet feedback from the destination subscriber station. In an exemplary embodiment, high data rates have a SLOTS_PER_PACKET value of one. In an exemplary embodiment, packets sent at the lowest data rate are sent in as many as sixteen forward link time slots, and therefore have a SLOTS_PER_PACKET value of sixteen. The base station and the subscriber stations use the same set of SLOTS_PER_PACKET values for each of the forward link data rates.

If at step 512 the base station has sent the packet in fewer than SLOTS_PER_PACKET slots, then the base station at step 514 sends the packet data in an additional forward link time slot. After sending the packet data in another time slot at step 514, the base station proceeds again to step 508 to decode the reverse link signal received from the destination subscriber station.

If at step 512 the base station has already sent the packet in SLOTS_PER_PACKET slots, then the base station proceeds to step 516. At step 516 the base station determines whether the destination subscriber station has requested that the packet be retransmitted in forward link time slots beyond the maximum number of time slots associated with the data rate of the packet. The base station at step 516 determines whether a Continue-Repeat signal was decoded from the destination subscriber station. If at step 516 a Continue-Repeat message was received from the destination subscriber station and successfully decoded at the base station, then the base station determines at step 518 whether the maximum number of repeats has already been sent for the packet. In an exemplary embodiment, each data rate has an associated maximum number of Continue-Repeat requests that can be made beyond the SLOTS_PER_PACKET. In an exemplary embodiment, this number for each data rate is called MAX_CONTINUE_REPEATS.

In an exemplary embodiment, MAX_CONTINUE_REPEATS is equal to SLOTS_PER_PACKET divided by two and rounded down if necessary. At step 518, the base station compares the number of Continue-Repeat signals that has been received for the packet with the MAX_CONTINUE_REPEATS value for the packet. If the number of Continue-Repeat signals that has been received for the packet is greater than or equal to MAX_CONTINUE_REPEATS, then the base station proceeds from step 518 to step 502. Otherwise, the base station sends the data in an additional slot at step 520. The base station then decodes the reverse link signal received from the destination subscriber station in the following slot at step 522. After decoding the signals received from the destination subscriber station at step 522, the base station proceeds to step 516 described above.

FIG. 5 shows the process for sending a single packet. As discussed above, a subscriber station may receive more than one multiple-slot packet at a time. For example, two multiple-slot packets may be received in alternating time slots. A single base station may send more than one multiple-slot packet in alternating forward link time slots, either to a single destination subscriber station or to multiple subscriber stations. In an exemplary embodiment, a base station uses the process shown in FIG. 5 to send each of potentially several multiple-slot packets, with each packet potentially sent at a different data rate.

In an exemplary embodiment, at step 520 the base station repeats the packet being sent to a destination subscriber station for a single forward link time slot. In an alternate embodiment, after the receipt of the first Continue-Repeat message, the base station will send MAX_CONTINUE_REPEATS repetitions of the packet data unless the base station receives a Stop-Repeat signal from the destination subscriber station.

In an exemplary embodiment, the base station transmits a multiple-slot packet in checks during time slots that are a fixed number of time slots apart. For example, the base station sends the preamble at step 506 and then sends the next slot of data at step 514 five time slots later. In addition, the different time slots used to send the multiple-slot packet at step 514 are spaced at even five-slot intervals. At step 510 after sending each time slot of the packet at steps 506 or 514, the base station checks whether it received a Stop-Repeat signal from the destination subscriber station. In an alternate embodiment, the base station sends the first several time slots of a multiple-slot packet in consecutive forward link time slots. For example, the base station sends the first eight slots of a sixteen-slot packet in consecutive time slots. After that, the base station sends subsequent time slots for the packet at five time slot intervals. If the base station decodes a Stop-Repeat message from the destination subscriber station at step 510, the base station stops transmitting the packet no matter how many time slots have been transmitted.

Figure 6:
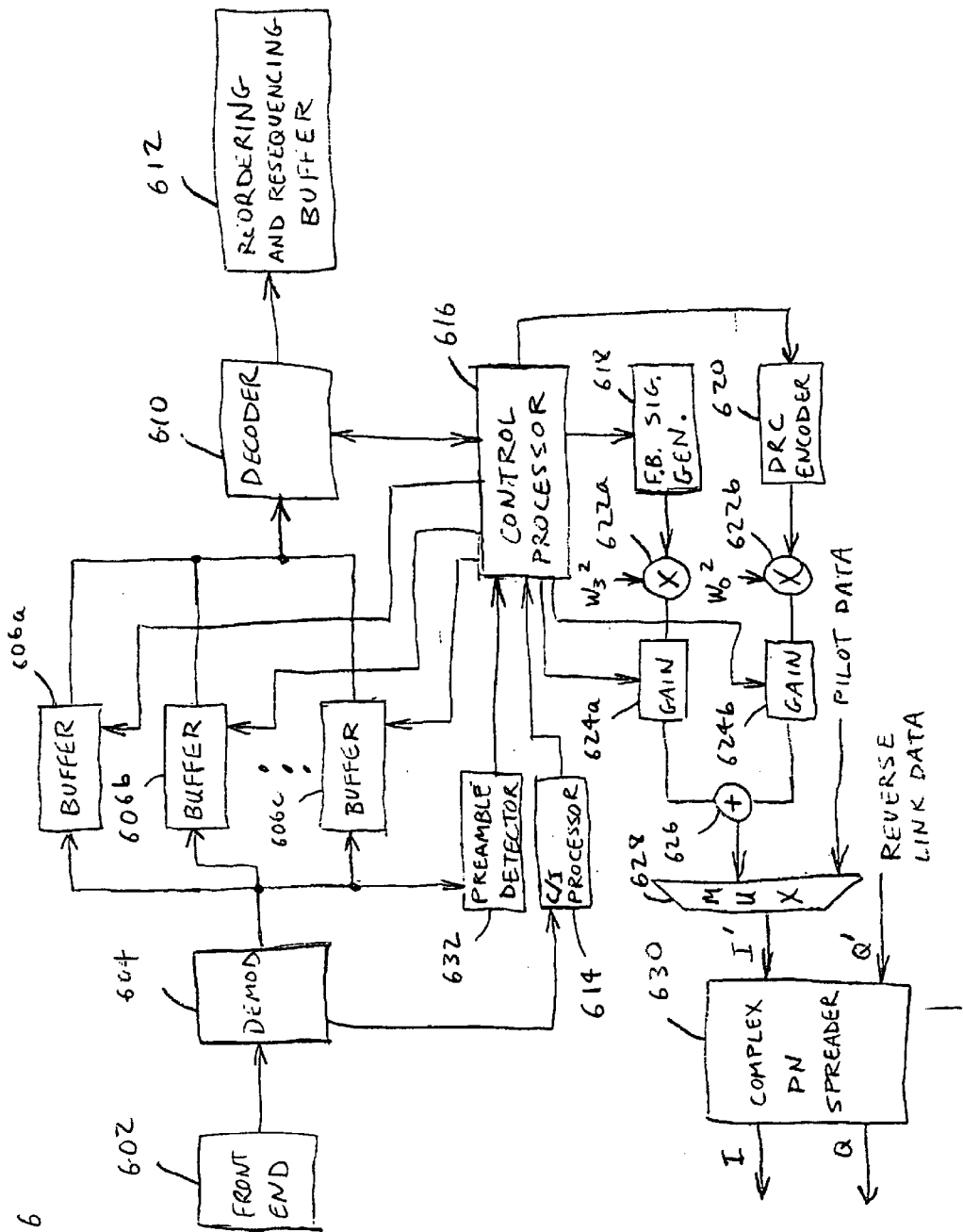
FIG. 6 is a diagram of an exemplary subscriber station apparatus.

FIG. 6 is a block diagram of an exemplary subscriber station apparatus. Forward link signals are received, downconverted, and sampled at front end 602, and the resultant sample stream is provided to demodulator 604. Demodulator 604 demodulates the received signals and provides the demodulated samples to packet accumulation buffers (referred to as just buffers) 606. Although the exemplary system is shown with three buffers 606, a subscriber station may have a greater or lesser number of packet accumulation buffers. Though the demodulated signal is provided to each buffer 606, only one buffer, for example buffer 606a, accumulates the samples in any particular time slot. Control processor 616 provides control signals to each buffer 606 that control when the buffer 606 accumulates the data arriving from demodulator 604. Control processor 616 controls the buffers 606 such that buffer 606a performs accumulation of samples that correspond to entire forward link time slots. For example, in an exemplary embodiment, the subscriber station receives two multiple-slot packets at a time within alternating time slots. Control processor 616 directs buffer 606a to accumulate samples for the even time slots, and directs buffer 606b to accumulate samples for the odd time slots.

After the samples have been accumulated over a forward link time slot, control processor 616 directs the buffer that accumulated the data for the time slot, for example buffer 606a, to provide accumulated samples to decoder 610. Decoder 610 then attempts to decode data from the accumulated samples received from buffer 606a. Before the first slot of data for a new packet is received into a buffer 606, that buffer is cleared. Clearing the buffer before receiving new packet data prevents residual accumulated samples from the previous packet from interfering with decoding the samples for the new packet. Decoder 610 provides successfully decoded packets to reordering and resequencing buffer 612.

In an exemplary embodiment, the first time slot associated with a new packet is transmitted with a preamble. The preamble is punctured into the data of the first slot of data and is decoded from the demodulated samples in preamble detector 632. Puncturing is a technique well known in the art for transmitting an additional signal within a forward error correction encoded symbol stream. Preamble detector 632 receives the demodulated samples from decoder 610 and decodes preambles from the received demodulated samples and provides the decoded preamble information to control processor 616. Though shown as a separate element from control processor 616, preamble detector 632 may be incorporated into control processor 616, with preamble detection and decoding and control processing being accomplished within a single processor.

Data information is provided from demodulator 604 to carrier-to-interference ratio (C/I) processor 614. In an exemplary embodiment, C/I processor 614 analyzes the received signal quality of pilot burst signals received from one or more base stations. In an exemplary embodiment, C/I processor 614 uses this pilot burst information to predict the highest data rate at which a packet sent from a serving base station may be successfully decoded by the subscriber station. Based on this prediction, C/I processor 614 sends an information signal to control processor 616. Though shown as a separate element from control processor 616, C/I processor 614 may be incorporated into control processor 616, with C/I calculations and control processing being accomplished within a single processor. Control processor 616 sends rate information to DRC encoder 620 to be encoded into a DRC code word. Signals generated by DRC encoder 620 are spread using Walsh spreader 622b. In an exemplary embodiment, signals generated by DRC encoder 620 are spread using 4-ary Walsh function $W_0^4$ in Walsh spreader 622b. The output signals of Walsh spreader 622b are then gain-controlled in gain block 624b. The gains applied in gain block 624b are controlled by control processor 616.

In an exemplary embodiment, control processor 616 also determines when a Stop-Repeat signal or a Continue-Repeat signal should be sent. Control processor 616 sends a first signal to Feedback Signal Generator 618 that causes Feedback Signal Generator 618 to generate a Stop-Repeat signal. Control processor 616 sends a second signal to Feedback Signal Generator 618 that causes Feedback Signal Generator 618 to generate a Continue-Repeat signal. Signals generated by Feedback Signal Generator 618 are spread using 4-ary Walsh function $W_3^4$ in Walsh spreader 622a. The output signals of Walsh spreader 622a are then gain-controlled in gain block 624a. The gains applied in gain block 624a are controlled by control processor 616.

In an exemplary embodiment, the gain-controlled signals from gain blocks 624 are summed in summing block 626 before being provided to multiplexor (MUX) 628. MUX 628 multiplexes the output signals of summer 626 with a pilot channel signal. In an exemplary embodiment, the output signals of gain blocks 624 are part of a media access control (MAC) channel that is punctured into the continuous pilot channel signal by MUX 628. The output signal of MUX 628 is provided as an in-phase component of a signal to complex pseudonoise (PN) spreader 630. In an exemplary embodiment, the quadrature-phase component of the signal carries reverse link packet data being transmitted by the subscriber station. The output of complex PN spreader 630 is then upconverted, amplified, and transmitted by the subscriber station.

In an exemplary embodiment, control processor 616 sends forward link rate information to decoder 610 and controls buffers 606 based on the DRC signals previously sent through DRC encoder 620. In an exemplary embodiment, a serving base station may only send packets to the subscriber station at the rates requested in the subscriber station's DRC signals. Allowing the subscriber station to dictate the forward link data rate makes blind rate detection at the subscriber station unnecessary. In an alternate embodiment, the base station may send packets using a data rate other than those specified in the subscriber station's DRC signals. In the alternate embodiment, decoder 610 performs blind rate detection.

In an exemplary embodiment, demodulator 604 performs such functions as PN despreading, Walsh despreading, and deinterleaving of the data signals received from front end 602. The deinterleaving performed by demodulator 604 may utilize any of a number of interleaving techniques, such as block interleaving and bit reversal interleaving. In an exemplary embodiment, decoder 610 performs forward error correction (FEC) decoding of the data signals received from buffers 606. Decoder 610 may utilize any of several forward error correction coding techniques, including turbo-coding, convolutional coding, block coding, or other forms of coding including soft decision coding. In an exemplary embodiment, control processor 616 may be a general-purpose microprocessor, digital signal processor (DSP), programmable logic device, application specific integrated circuit (ASIC), or any other device capable of performing the functions of control processor 616 described herein. In an exemplary embodiment, C/I processor 614 may be a general-purpose microprocessor, digital signal processor (DSP), programmable logic device, application specific integrated circuit (ASIC), or any other device capable of performing the functions of C/I processor 614 described herein.

Figure 7:
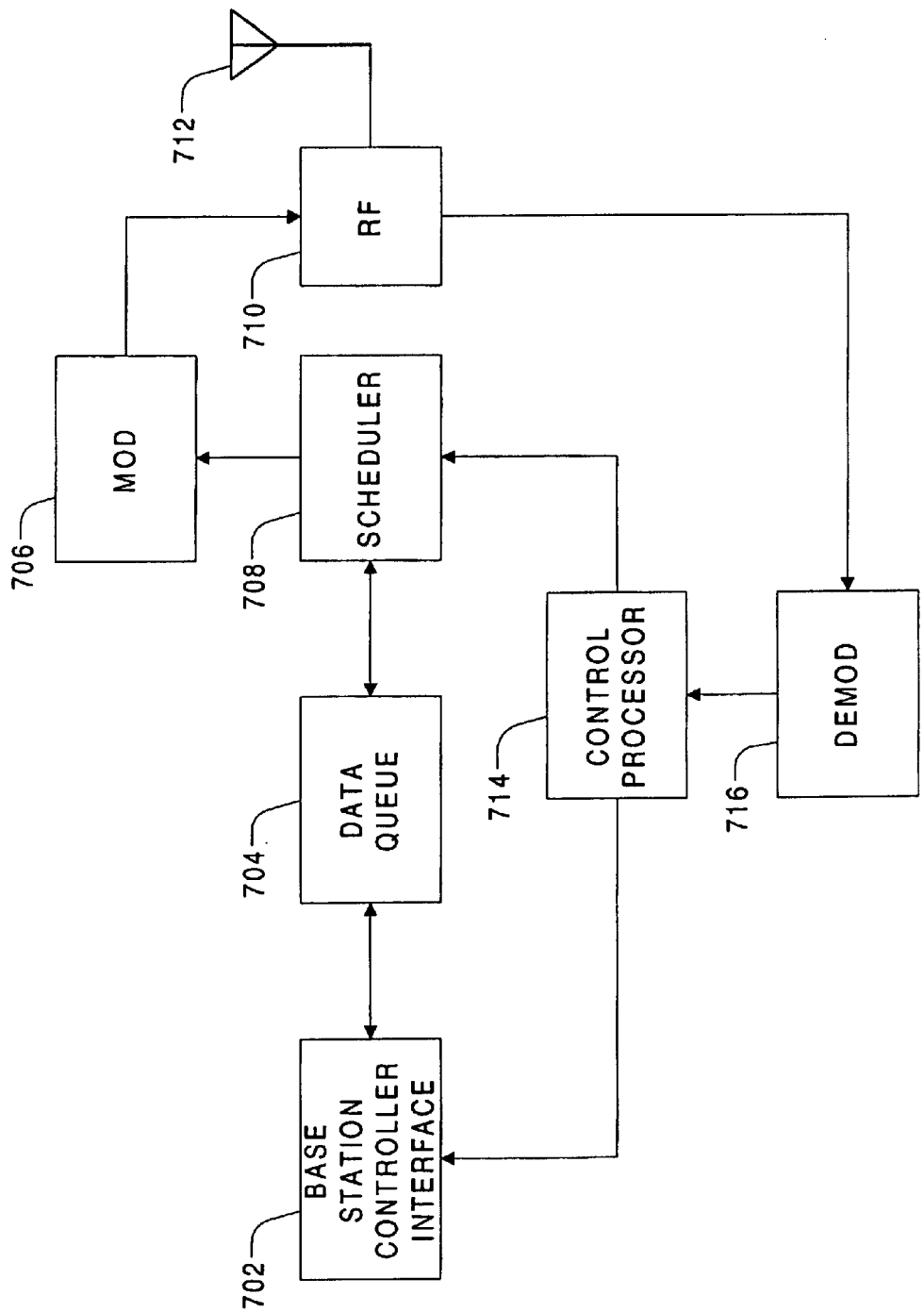
FIG. 7 is a diagram of an exemplary base station apparatus.

FIG. 7 is a block diagram of an exemplary base station apparatus. In an exemplary embodiment, data packets are received from a base station controller (not shown) through base station controller (BSC) interface 702. Each packet received from the base station controller includes an address that identifies the intended destination subscriber station. The packets are saved in data queue 704 until they are either transmitted or dropped. Scheduler 708 selects the destination subscriber station associated with each forward link time slot, retrieves the corresponding forward link packet from data queue 704, and provides the data to modulator (MOD) 706. Modulator 706 modulates the packet data received from scheduler 708 and provides the modulated signals to radio frequency (RF) unit 710. RF unit 710 upconverts and amplifies the modulated signals and transmits the upconverted signals through antenna 712. Though one antenna 712 is shown, RF unit 710 could transmit and receive signals through multiple antennas.

In an exemplary embodiment, the base station receives reverse link signals through antenna 712, where they are downconverted in RF unit 710. RF unit 710 provides the downconverted, sampled signals to demodulator 716. Demodulated packets are provided by demodulator 716 to control processor 714, which routes data packets to base station controller (BSC) interface 702. In an exemplary embodiment, BSC interface 702 then sends the reverse link packets to a base station controller (not shown) through a backhaul interface (not shown).

Demodulator 716 also decodes Stop-Repeat and Continue-Repeat signals and provides those signals to control processor 714. Control processor 714 sends Stop-Repeat and Continue-Repeat information to scheduler 708. Upon receiving a Stop-Repeat signal or when no more repeats of a packet are to be sent, scheduler 708 clears the data of that packet from data queue 704. That space in the data queue can then be used for subsequent packets. Upon receiving a Continue-Repeat signal, scheduler 708 retransmits the data of the associated packet from data queue 704 in a subsequent forward link time slot.

In an exemplary embodiment, modulator 706 performs such functions as forward error correction (FEC) encoding, interleaving, Walsh spreading, and PN spreading of the data received from scheduler 708. In an exemplary embodiment, demodulator 716 performs such functions as PN despreading, Walsh despreading, deinterleaving, and forward error correction (FEC) decoding of the data signals received from RF unit 710. The interleaving and deinterleaving performed by modulator 706 and demodulator 716 may utilize any of a number of interleaving techniques, such as block interleaving and bit reversal interleaving. Modulator 706 and demodulator 716 may utilize any of several forward error correction techniques, including turbo-coding, convolutional coding, block coding, or other forms of coding including soft decision coding. In an exemplary embodiment, scheduler 708 may be a general-purpose microprocessor, digital signal processor (DSP), programmable logic device, application specific integrated circuit (ASIC), or any other device capable of performing the algorithms described herein.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method of claim 1 for receiving a first packet from a source network node comprising the steps of:
    generating a data rate control signal based on the signal quality of a received signal transmitted by a source network node;
    sending said data rate control signal to the source network node;
    receiving a first signal having a data rate based on said data rate control signal from the source network node, comprising decoding a preamble from the first signal indicating that the first signal contains a packet of data addressed to the destination network nodes;
    measuring the signal quality of said first signal to form a first signal quality metric; and
    sending a first feedback signal based on said first signal quality metric.

2. A method for receiving a first packet from a source network node comprising the steps of:
    generating a data rate control signal based on the signal quality of a received signal transmitted by a source network node;
    sending said data rate control signal to the source network node;
    receiving a first signal having a data rate based on said data rate control signal from the source network node, comprising extracting the first signal from a first time slot of a predetermined number of time slots, wherein the predetermined number of time slots is based the data rates;
    measuring the signal quality of said first signal to form a first signal quality metric; and
    sending a first feedback signal based on said first signal quality metric.

3. The method of claim 2 wherein said step of receiving the first signal further comprises determining the predetermined number of time slots based on previous data rate control signals transmitted.

4. A method for receiving a first packet from a source network node comprising the steps of:
    generating a data rate control signal based on the signal quality of a received signal transmitted by a source network node;
    sending said data rate control signal to the source network node;
    receiving a first signal having a data rate based on said data rate control signal from the source network node, wherein the first signal is received within a first time slot having a predetermined slot durations;
    accumulating said first signal into a first set of accumulated packet samples associated with the packet;
    measuring the signal quality of said first signal to form a first signal quality metric; and
    sending a first feedback signal based on said first signal quality metric.

5. The method of claim 4 wherein said step of measuring the signal quality of said first signal further comprises attempting to decode the packet from said first set of accumulated packet samples, and wherein said first signal quality metric is based on the results of said step of attempting to decode.

6. The method of claim 5 wherein said first signal quality metric indicates that the packet was successfully decoded in said step of attempting to decode, and wherein said first feedback signal is a Stop-Repeat signal.

7. The method of claim 5 wherein said first signal quality metric indicates that the packet was not successfully decoded in said step of attempting to decode, and wherein said first feedback signal is a Continue-Repeat signal.

8. The method of claim 4 wherein the first signal is received within a first time slot having a predetermined slot duration, the method further comprising the steps of:
    accumulating said first signal into a first set of accumulated packet samples associated with the packet;
    receiving a second signal within a second time slot having said predetermined slot duration;
    accumulating said second signal into said first set of accumulated packet samples associated with the packet;
    measuring the signal quality of said first signal and said second signal to form a second signal quality metric; and
    sending a second feedback signal based on said second signal quality metric.

9. The method of claim 8 wherein the elapsed time between the end of said first time slot and the beginning of said second time slot has a predetermined duration equal to a multiple of said predetermined slot duration.

10. The method of claim 9 wherein the multiple is two.

11. The method of claim 9 wherein the multiple is three.

12. The method of claim 9 wherein the multiple is four.

13. A method for receiving a first packet from a source network node comprising the steps of:
    generating a data rate control signal based on the signal quality of a received signal transmitted by a source network node;
    sending said data rate control signal to the source network node;
    receiving a first signal having a data rate based on said data rate control signal from the source network node;
    measuring the signal quality of said first signal to form a first signal quality metric, comprising measuring the carrier-to-interference (C/I) ratio of the received signal; and
    sending a first feedback signal based on said first signal quality metric.

14. The method of claim 13 wherein said data rate control signal specifies one requested data rate of a predetermined set of data rates, and wherein said data rate is equal to said one requested data rate.

15. A method for receiving a first packet from a source network node comprising the steps of:
    generating a data rate control signal based on the signal quality of a received signal transmitted by a source network node;
    sending said data rate control signal to the source network node;
    receiving a first signal having a data rate based on said data rate control signal from the source network node;
    measuring the signal quality of said first signal to form a first signal quality metric, comprising attempting to decode the packet from said first set of accumulated samples; and
    sending a first feedback signal based on said first signal quality metric.

16. A method for receiving a first packet from a source network node comprising the steps of:

generating a data rate control signal based on the signal quality of a received signal transmitted by a source network node;

sending said data rate control signal to the source network node;

receiving a first signal having a data rate based on said data rate control signal from the source network node;

measuring the signal quality of said first signal to form a first signal quality metric, comprising measuring the carrier-to-interference ratio of one or more received pilot burst signals; and sending a first feedback signal based on said first signal quality metric.

17. A method for receiving a first packet from a source network node comprising the steps of:

generating a data rate control signal based on the signal quality of a received signal transmitted by a source network node;

sending said data rate control signal to the source network node;

receiving a first signal having a data rate based on said data rate control signal from the source network node;

measuring the signal quality of said first signal to form a first signal quality metric;

sending a first feedback signal based on said first signal quality metric, wherein said feedback signal is a Stop-Repeat signal; and decoding the packet from said first set of accumulated packet samples.

18. A method for receiving a first packet from a source network node comprising the steps of:

generating a data rate control signal based on the signal quality of a received signal transmitted by a source network node;

sending said data rate control signal to the source network node;

receiving a first signal having a data rate based on said data rate control signal from the source network node;

measuring the signal quality of said first signal to form a first signal quality metric;

sending a first feedback signal based on said first signal quality metrics wherein said feedback signal is a Continue-Repeat signal;

accumulating a second signal into said first set of accumulated packet samples associated with the packet;

measuring the signal quality of said second signal to generate a second signal quality metric;

generating a decoding prediction metric based on said first signal quality metric and said second signal quality metric;

comparing said decoding prediction metric with a decoder prediction threshold; and sending a feedback signal based on said step of comparing.

19. A method for receiving a first packet from a source network node comprising the steps of:

generating a data rate control signal based on the signal quality of a received signal transmitted by a source network node;

sending said data rate control signal to the source network node;

receiving a first signal having a data rate based on said data rate control signal from the source network node;

measuring the signal quality of said first signal to form a first signal quality metric; and sending a first feedback signal based on said first signal quality metric, comprising:

covering the symbols of a Stop-Repeat signal with a first Walsh code to generate a Walsh-covered Stop-Repeat signal; and transmitting said Walsh-covered Stop-Repeat signal concurrently with one or more additional signals covered with a second Walsh code, wherein said second Walsh code is orthogonal to said first Walsh code.

20. A method for receiving a first packet from a source network node comprising the steps of:

generating a data rate control signal based on the signal quality of a received signal transmitted by a source network node;

sending said data rate control signal to the source network node;

receiving a first signal having a data rate based on said data rate control signal from the source network node;

measuring the signal quality of said first signal to form a first signal quality metric; and sending a first feedback signal based on said first signal quality metric, comprising:

covering the symbols of a Continue-Repeat signal with a first Walsh code to generate a Walsh-covered Stop-Repeat signal; and transmitting said Walsh-covered Stop-Repeat signal concurrently with one or more additional signals covered with a second Walsh code, wherein said second Walsh code is orthogonal to said first Walsh code.

21. A method for sending a first data packet from a source network node to a destination network node, the method comprising the steps of:

receiving a data rate control signal from the destination network node;

determining a number of copies of the first data packet to send to the destination network node based on said data rate control signal;

encoding a first copy of the first data packet into a first signal;

sending said first signal to the destination network node;

receiving a Stop-Repeat signal from the destination network node; and sending fewer than said number of copies to the destination network node based on said Stop-Repeat signal.

22. The method of claim 21 wherein said step of sending the first signal further comprises encoding a preamble into the first signal indicating that the first signal contains a packet of data addressed to the destination network node.

23. The method of claim 21 further comprising the steps of:

encoding a second copy of the first data packet into a second signal; and sending said second signal to the destination network node before said step of receiving a Stop-Repeat signal.

24. The method of claim 23 wherein the first signal is transmitted within a first time slot having a predetermined slot duration, and wherein the second signal is transmitted within a second time slot having said predetermined slot duration, an wherein the elapsed time between the end of said first time slot and the beginning of said second time slot has a predetermined duration equal to a multiple of said predetermined slot duration.

25. The method of claim 24 wherein the multiple is two.
26. The method of claim 24 wherein the multiple is three.
27. The method of claim 24 wherein the multiple is four.
28. The method of claim 23 further comprising the steps of:
   encoding a first copy of a second data packet into a third signal; and
   sending said third signal to the destination network node, wherein the third signal is transmitted within a third time slot having said predetermined slot duration, and wherein said third time slot is disposed between said first time slot and said second time slot.
29. The method of claim 28 wherein the third time slot begins immediately after the first time slot ends, and wherein the second time slot begins immediately after the third time slot ends.
30. The method of claim 21 wherein said data rate control signal specifies one requested data rate of a predetermined set of data rates, wherein each data rate within said predetermined set of data rates is associated with a predetermined number of time slots, and wherein said number of copies is equal to the predetermined number of time slots associated with the requested data rate.
31. The method of claim 21 wherein said step of receiving a Stop-Repeat signal further comprises the sub-steps of:
   decovering the symbols of the Stop-Repeat signal with a first Walsh code; and
   decovering the symbols of a data signal with a second Walsh code, wherein said second Walsh code is orthogonal to said first Walsh code, and wherein said data signal is received from the destination network node.
32. The method of claim 21 wherein said step of sending said first signal further comprises sending one or more pilot burst signals.
33. A method for sending a data packet from a source network node to a destination network node, the method comprising the steps of:
   receiving a data rate control signal from the destination network node;
   determining a number of copies of the data packet to send to the destination network node based on said data rate control signal;
   sending a first signal containing a copy of the data packet to the destination network node;
   receiving a Continue-Repeat signal from the destination network node; and
   sending greater than said number of copies to the destination network node based on said Continue-Repeat signal.
34. The method of claim 33 wherein said step of sending the first signal further comprises encoding a preamble into the first signal indicating that the first signal contains a packet of data addressed to the destination network node.
35. The method of claim 33 further comprising the steps of:
   encoding a second copy of the first data packet into a second signal; and
   sending said second signal to the destination network node before said step of receiving a Continue-Repeat signal.

36. The method of claim 35 wherein the first signal is transmitted within a first time slot having a predetermined slot duration, and wherein the second signal is transmitted within a second time slot having said predetermined slot duration, an wherein the elapsed time between the end of said first time slot and the beginning of said second time slot has a predetermined duration equal to a multiple of said predetermined slot duration.
37. The method of claim 36 wherein the multiple is two.
38. The method of claim 36 wherein the multiple is three.
39. The method of claim 36 wherein the multiple is four.
40. The method of claim 35 further comprising the steps of:
   encoding a first copy of a second data packet into a third signal; and
   sending said third signal to the destination network node, wherein the third signal is transmitted within a third time slot having said predetermined slot duration, and wherein said third time slot is disposed between said first time slot and said second time slot.
41. The method of claim 40 wherein the third time slot begins immediately after the first time slot ends, and wherein the second time slot begins immediately after the third time slot ends.
42. The method of claim 33 wherein said data rate control signal specifies one requested data rate of a predetermined set of data rates, wherein each data rate within said predetermined set of data rates is associated with a predetermined number of time slots, and wherein said number of copies is equal to the predetermined number of time slots associated with the requested data rate.
43. The method of claim 33 wherein said step of receiving a Continue-Repeat signal further comprises the sub-steps of:
   decovering the symbols of the Continue-Repeat signal with a first Walsh code; and
   decovering the symbols of a data signal with a second Walsh code, wherein said second Walsh code is orthogonal to said first Walsh code, and wherein said data signal is received from the destination network node.
44. The method of claim 33 wherein said step of sending said first signal further comprises sending one or more pilot burst signals.
45. A network node apparatus for receiving a first packet from a source network node comprising:
   a demodulator for demodulating a downconverted sampled signal to produce a stream of demodulated samples;
   a first accumulation buffer for accumulating a first subset of said demodulated samples associated with the first packet;
   a decoder for decoding the contents of said first accumulation buffer to decode the data of the first packet;
   a feedback signal generator for generating a feedback signal sent to the source network node based on a feedback control signal;
   a control processor for controlling the subset of the stream of demodulated samples accumulated in said first accumulation buffer and for generating the feedback control signal based on the signal quality of the downconverted sampled signal;
   a transmitter for transmitting the feedback signal to the source network node; and
   a preamble detector for detecting and decoding a preamble received within the stream of demodulated samples.

46. A network node apparatus for receiving a first packet from a source network node comprising:
- a demodulator for demodulating a downconverted sampled signal to produce a stream of demodulated samples;
- a first accumulation buffer for accumulating a first subset of said demodulated samples associated with the first packet;
- a decoder for decoding the contents of said first accumulation buffer to decode the data of the first packet;
- a feedback signal generator for generating a feedback signal sent to the source network node based on a feedback control signal;
- a control processor for controlling the subset of the stream of demodulated samples accumulated in said first accumulation buffer and for generating the feedback control signal based on the signal quality of the downconverted sampled signal;
- a transmitter for transmitting the feedback signal to the source network node; and
- a signal quality processor for generating a received signal quality signal based on the received signal quality of the downconverted sampled signal and providing the received signal quality signal to said control processor.

47. The apparatus of claim 46 further comprising a data rate control encoder for encoding a data rate control signal sent to the source network node based on the received signal quality signal.

48. The apparatus of claim 47 further comprising a first Walsh encoder for covering the data rate control signal with a first Walsh code.

49. The apparatus of claim 48 further comprising a second Walsh encoder for covering the feedback signal with a second Walsh code that is orthogonal to said first Walsh code.

50. A network node apparatus for receiving a first packet from a source network node comprising:
- a demodulator for demodulating a downconverted sampled signal to produce a stream of demodulated samples;
- a first accumulation buffer for accumulating a first subset of said demodulated samples associated with the first packet;
- a decoder for decoding the contents of said first accumulation buffer to decode the data of the first packet;
- a feedback signal generator for generating a feedback signal sent to the source network node based on a feedback control signal, wherein said feedback signal generator is configured to generate a Stop-Repeat signal to the source network node based on the feedback control signal;
- a control processor for controlling the subset of the stream of demodulated samples accumulated in said first accumulation buffer and for generating the feedback control signal based on the signal quality of the downconverted sampled signal; and
- a transmitter for transmitting the feedback signal to the source network node.

51. A network node apparatus for receiving a first packet from a source network node comprising:
- a demodulator for demodulating a downconverted sampled signal to produce a stream of demodulated samples;
- a first accumulation buffer for accumulating a first subset of said demodulated samples associated with the first packet;
- a decoder for decoding the contents of said first accumulation buffer to decode the data of the first packet;
- a feedback signal generator for generating a feedback signal sent to the source network node based on a feedback control signal;
- a control processor for controlling the subset of the stream of demodulated samples accumulated in said first accumulation buffer and for generating the feedback control signal based on the signal quality of the downconverted sampled signal; and
- a transmitter for transmitting the feedback signal to the source network node, wherein said feedback signal generator is configured to generate a Continue-Repeat signal to the source network node based on a control signal from said control processor.

52. A network node apparatus for receiving a first packet from a source network node comprising:
- a demodulator for demodulating a downconverted sampled signal to produce a stream of demodulated samples;
- a first accumulation buffer for accumulating a first subset of said demodulated samples associated with the first packet;
- a decoder for decoding the contents of said first accumulation buffer to decode the data of the first packet;
- a feedback signal generator for generating a feedback signal sent to the source network node based on a feedback control signal;
- a control processor for controlling the subset of the stream of demodulated samples accumulated in said first accumulation buffer and for generating the feedback control signal based on the signal quality of the downconverted sampled signal, wherein said control processor is configured to generate the feedback control signal based on the signal quality of one or more pilot burst signals received concurrently with the first subset of said demodulated samples; and
- a transmitter for transmitting the feedback signal to the source network node.

53. A network node apparatus for receiving a first packet from a source network node comprising:
- a demodulator for demodulating a downconverted sampled signal to produce a stream of demodulated samples;
- a first accumulation buffer for accumulating a first subset of said demodulated samples associated with the first packet;
- a decoder for decoding the contents of said first accumulation buffer to decode the data of the first packet;
- a feedback signal generator for generating a feedback signal sent to the source network node based on a feedback control signal;
- a control processor for controlling the subset of the stream of demodulated samples accumulated in said first accumulation buffer and for generating the feedback control signal based on the signal quality of the downconverted sampled signal, wherein said control processor is configured to generate the feedback control signal based on the successful decoding of the first packet in said decoder; and
- a transmitter for transmitting the feedback signal to the source network node.

54. A network node apparatus for receiving a first packet from a source network node comprising:
- a demodulator for demodulating a downconverted sampled signal to produce a stream of demodulated samples;
- a first accumulation buffer for accumulating a first subset of said demodulated samples associated with the first packet;
- a decoder for decoding the contents of said first accumulation buffer to decode the data of the first packet;
- a feedback signal generator for generating a feedback signal sent to the source network node based on a feedback control signal;
- a control processor for controlling the subset of the stream of demodulated samples accumulated in said first accumulation buffer and for generating the feedback control signal based on the signal quality of the downconverted sampled signal;
- a transmitter for transmitting the feedback signal to the source network node; and
- a second accumulation buffer, for accumulating a second subset of said demodulated samples associated with a second packet, wherein portions of the second subset are disposed between portions of the first subset.

55. A network node apparatus for sending a first data packet to a destination network node comprising:
- a data queue for storing a plurality of data packets addressed to a plurality of network nodes, wherein the destination network node is one of the plurality of network nodes;
- a demodulator for decoding data rate control signals and feedback signals received from the destination network node;
- a scheduler for selecting a number of time slots for sending the first data packet, wherein the number of time slots is based on a data rate;
- a control processor for selecting the data rate based on the data rate control signals and for changing the number of time slots based on the feedback signals; and
- a modulator for modulating the data from the first packet and puncturing a preamble into the data of the first packet.

56. A network node apparatus for sending a first data packet to a destination network node comprising:
- a data queue for storing a plurality of data packets addressed to a plurality of network nodes, wherein the destination network node is one of the plurality of network nodes;
- a demodulator for decoding data rate control signals and feedback signals received from the destination network node;
- a scheduler for selecting a number of time slots for sending the first data packet, wherein the number of time slots is based on a data rate; and
- a control processor for selecting the data rate based on the data rate control signals and for changing the number of time slots based on the feedback signals, wherein said control processor is configured to decrease the number of time slots used to transmit the first packet based on the decoding of a Stop-Repeat signal in said demodulator.

57. A network node apparatus for sending a first data packet to a destination network node comprising:
- a data queue for storing a plurality of data packets addressed to a plurality of network nodes, wherein the destination network node is one of the plurality of network nodes;
- a demodulator for decoding data rate control signals and feedback signals received from the destination network node;
- a scheduler for selecting a number of time slots for sending the first data packet, wherein the number of time slots is based on a data rate; and
- a control processor for selecting the data rate based on the data rate control signals and for changing the number of time slots based on the feedback signals, wherein said control processor is configured to increase the number of time slots used to transmit the first packet based on the decoding of a Continue-Repeat signal in said demodulator.

58. A network node apparatus for sending a first data packet to a destination network node comprising:
- a data queue for storing a plurality of data packets addressed to a plurality of network nodes, wherein the destination network node is one of the plurality of network nodes;
- a demodulator for decoding data rate control signals and feedback signals received from the destination network node, wherein said demodulator comprises a first Walsh despreader for decovering the data rate control signals using a first Walsh code
- a scheduler for selecting a number of time slots for sending the first data packet, wherein the number of time slots is based on a data rate; and
- a control processor for selecting the data rate based on the data rate control signals and for changing the number of time slots based on the feedback signals.

59. The apparatus of claim 58 wherein said demodulator further comprises a second Walsh despreader for decovering the feedback signals using a second Walsh code, wherein said first Walsh code is orthogonal to said second Walsh code.

60. A method in a wireless communication system device, comprising:
- receiving portions of a multi-slot packet at a first data rate, each portion received during a separate time slot, the multi-slot packet having a maximum number of time slots for transmission, the maximum number of time slots for transmission allocating slots for retransmission of the multi-slot packet, wherein said maximum number of time slots is determined by said first data rate associated with said multi-slot packet;
- accumlating the received portions of the multi-slot packet;
- attempting to decode the accumulated portions of the multi-slot packet; and
- if the packet decode is successful, sending a Stop-Repeat message.

61. The method as in claim 60, further comprising:
- if the decode is not successful, comparing the number of received portions to a maximum number of time slots for transmission; and
- if the number of received portions is equal to a maximum number of time slots for transmission, sending a Continue-Repeat message after repeating the multi-slot packet over the maximum number of time slots associated with the packet's data rate.

62. The method as in claim 61, wherein the maximum number of time slots for transmission is based on the first data rate.

63. A method in a wireless network device, comprising:

allocating a maximum number of time slots for transmission of a multi-slot packet; transmitting portions of the multi-slot packet at a first data rate, each portion transmitted during a separate time slot;

receiving a Stop-Repeat message prior to expiration of the maximum number of time slots for transmission of the multi-slot packet; and terminating transmission of the multi-slot packet, wherein the maximum number of time slots for transmission is based on the first data rate.

64. The method as in claim 63, further comprising:

after expiration of the maximum number of transmission of the multi-slot packet, receiving a Continue-Repeat message; and transmitting a next portion of the multi-slot packet in a time slot.

65. A wireless communication device, comprising:

means for receiving portions of a multi-slot packet at a first data rate, each portion received during a separate time slot, the multi-slot packet having a maximum number of time slots for transmission, the maximum number of time slots for transmission allocating slots for retransmission of the multi-slot packet, wherein said maximum number of time slots is determined by said first data rate associated with said multi-slot packet;

means for accumulating the received portions of the multi-slot packet;

means for attempting to decode the accumulated portions of the multi-slot packet;

means for sending a Stop-Repeat message if the packet decode is successful.

66. A wireless network device, comprising:

means for allocating a maximum number of time slots for transmission of a multi-slot packet;

means for transmitting portions of the multi-slot packet at a first data rate, each portion transmitted during a separate time slot;

means for receving a Stop-Repeat message prior to expiration of the maximum number of time slots for transmission of the multi-slot packet; and means for terminating transmission of the multi-slot packet, wherein the maximum number of time slots for transmission is based on the first data rate.

67. A wireless apparatus, comprising:

receiver adapted to receive portions of a multi-slot packet at a first data rate, each portion received during a separate time slot, the multi-slot packet having a maximum number of time slots for transmission, the maximum number of time slots for transmission allocating slots for retransmission of the multi-slot packet, wherein said maximum number of time slots is determined by said first data rate associated with said multi-slot packet;

accumulating buffer adapted to accumulate the received portions of the multi-slot packet;

decoder adapted to attempt to decode the accumulated portions of the multi-slot packet;

transmitter adapted to send a Stop-Repeat message if the packet decode is successful.

68. The apparatus of claim 67, wherein the transmitter if further adapted to send a Continue-Repeat message after repeating the multi-slot packet over the maximum number of the slots associated with the packet's data rate if the decode is not successful.

69. The apparatus of claim 67, wherein the maximum number of time slots is based on the data rate.

70. The apparatus of claim 67, wherein the transmitter is further adapted to transmit a data rate control message requesting a data rate for transmission to the apparatus.

71. A wireless network device, comprising:

controller adapted to allocate a maximum number of time slots for transmission of a multi-slot packet;

transmitter adapted to transmit portions of the multi-slot packet at a first data rate, each portion transmitted during a separate time slot;

receiver adapted to receive a Stop-Repeat message prior to expiration of the maximum number of time slots for transmission of the multi-slot packet; and wherein the controller is further to terminate transmission of the multi-slot packet in response to the Stop-Repeat message, wherein the maximum number of time slots for transmission is based on the first data rate.

* * * * *